(12) United States Patent
Spoentgen et al.

(10) Patent No.: US 12,375,761 B2
(45) Date of Patent: *Jul. 29, 2025

(54) METHODS AND APPARATUS TO DEDUPLICATE AUDIENCE ESTIMATES FROM MULTIPLE COMPUTER SOURCES

(71) Applicant: The Nielsen Company (US), LLC, New York, NY (US)

(72) Inventors: Remy Spoentgen, Tampa, FL (US); Jonathan Sullivan, Hurricane, UT (US); Molly Poppie, Arlington Heights, IL (US); Gwendolyn Gillingham, Sunnyside, NY (US); Jessica Brinson, Chicago, IL (US); PengFei Yi, Shanghai (CN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,537

(22) Filed: May 28, 2024

(65) Prior Publication Data

US 2024/0314392 A1 Sep. 19, 2024

Related U.S. Application Data

(63) Continuation of application No. 18/146,275, filed on Dec. 23, 2022, now Pat. No. 12,022,155, which is a continuation of application No. PCT/CN2022/128682, filed on Oct. 31, 2022.

(60) Provisional application No. 63/322,100, filed on Mar. 21, 2022.

(51) Int. Cl.
*H04N 21/442* (2011.01)
*G06F 18/2132* (2023.01)
*G06F 18/2321* (2023.01)

(52) U.S. Cl.
CPC . *H04N 21/44222* (2013.01); *G06F 18/21326* (2023.01); *G06F 18/2321* (2023.01)

(58) Field of Classification Search
CPC ........ H04N 21/44222; G06F 18/21326; G06F 18/2321; H04H 60/66; G06Q 30/0251; G06Q 30/0273; G06Q 30/0242
USPC .......................................................... 725/14
See application file for complete search history.

(56) References Cited

U.S. PATENT DOCUMENTS

| 10,313,752 B2 * | 6/2019 | Nagaraja Rao .... G06Q 30/0201 |
| 2019/0147461 A1 * | 5/2019 | Sheppard ........... G06Q 30/0201 705/14.41 |

* cited by examiner

*Primary Examiner* — Adil Ocak

(57) ABSTRACT

Disclosed examples access media impression data via one or more wireless communications, the media impression data including panel data obtained from a meter and impression information obtained after an access of media at a computing device; determine an audience deduplication based on the panel data; determine odds ratios for platform combinations based on the audience deduplication; determine posterior distributions for the media based on the odds ratios; perform a sequential odds ratio insertion technique based on the posterior distributions to determine unique audience sizes; align the unique audience sizes based on a constraint; and generate a report including the aligned unique audience sizes.

16 Claims, 17 Drawing Sheets

INPUT TO ALIGNMENT MODEL

| PLATFORM MARGINALS | | | |
|---|---|---|---|
| CAMPAIGN | PLATFORM | PUBLISHER | REACH |
| CMP123 | TV | ALL | R1 |
| CMP123 | DSK | ALL | R2 |

800

| CAMPAIGN METADATA | | | INTEGRATINO MODEL OUTPUT | | |
|---|---|---|---|---|---|
| CAMPAIGN | TV_NETWORK | DSK_SITE | TV_ONLY | DSK_ONLY | TV_DSK |
| CMP123 | ALL | ALL | PRIOR1 | PRIOR2 | PRIOR3 |
| CMP123 | NET1 | ALL | PRIOR4 | PRIOR5 | PRIOR6 |

802

MAXIMUM ENTROPY OUTPUT

| TV_NETWORK | TV_ONLY | DSK_ONLY | TV_DSK |
|---|---|---|---|
| ALL | UA1 | UA2 | UA3 |
| NET1 | UA4 | UA5 | UA6 |
| NET2 | UA7 | UA8 | UA9 |

MAXIMUM ENTROPY CAN OUTPUT ILLOGICAL UA'S AT DIFFERENT AGGREGATION LEVELS I.E. TV_NETWORK=ALL < MAX (NET1, NET2)

FIG. 8

USThis disclosure is a continuation of U.S. patent application Ser. No. 18/146,275 filed on Dec. 23, 2022, now issued as U.S. Pat. No. 12,022,155, which is a continuation of PCT Patent Application No. PCT/CN2022/128682 filed on Oct. 31, 2022 and claims the benefit of U.S. Provisional Patent Application No. 63/322,100 filed on Mar. 21, 2022, each of which is hereby incorporated by reference in its entirety.

METHODS AND APPARATUS TO DEDUPLICATE AUDIENCE ESTIMATES FROM MULTIPLE COMPUTER SOURCES

CROSS-REFERENCE TO RELATED APPLICATION(S)

This disclosure is a continuation of U.S. patent application Ser. No. 18/146,275 filed on Dec. 23, 2022, now issued as U.S. Pat. No. 12,022,155, which is a continuation of PCT Patent Application No. PCT/CN2022/128682 filed on Oct. 31, 2022 and claims the benefit of U.S. Provisional Patent Application No. 63/322,100 filed on Mar. 21, 2022, each of which is hereby incorporated by reference in its entirety.

FIELD OF THE DISCLOSURE

This disclosure relates generally to computing systems, and, more particularly, to computing systems to deduplicate audience estimates from multiple computer sources.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel) for a predefined length of time. In some examples, the audience measurement entity obtains (e.g., directly, or indirectly from a media service provider) return path data (e.g., census data representative of a population of users) from media presentation devices (e.g., set-top boxes) that identifies tuning data from the media presentation devices. In such examples, because the return path data may not be associated with a known panelist, the audience measurement entity models and/or assigns viewers to represent the return path data. Additionally, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

BRIEF DESCRIPTION OF THE DRAWINGS

FIG. 8 illustrates example input data and output data corresponding to example alignment circuitry of FIG. 2.

Figure 1:
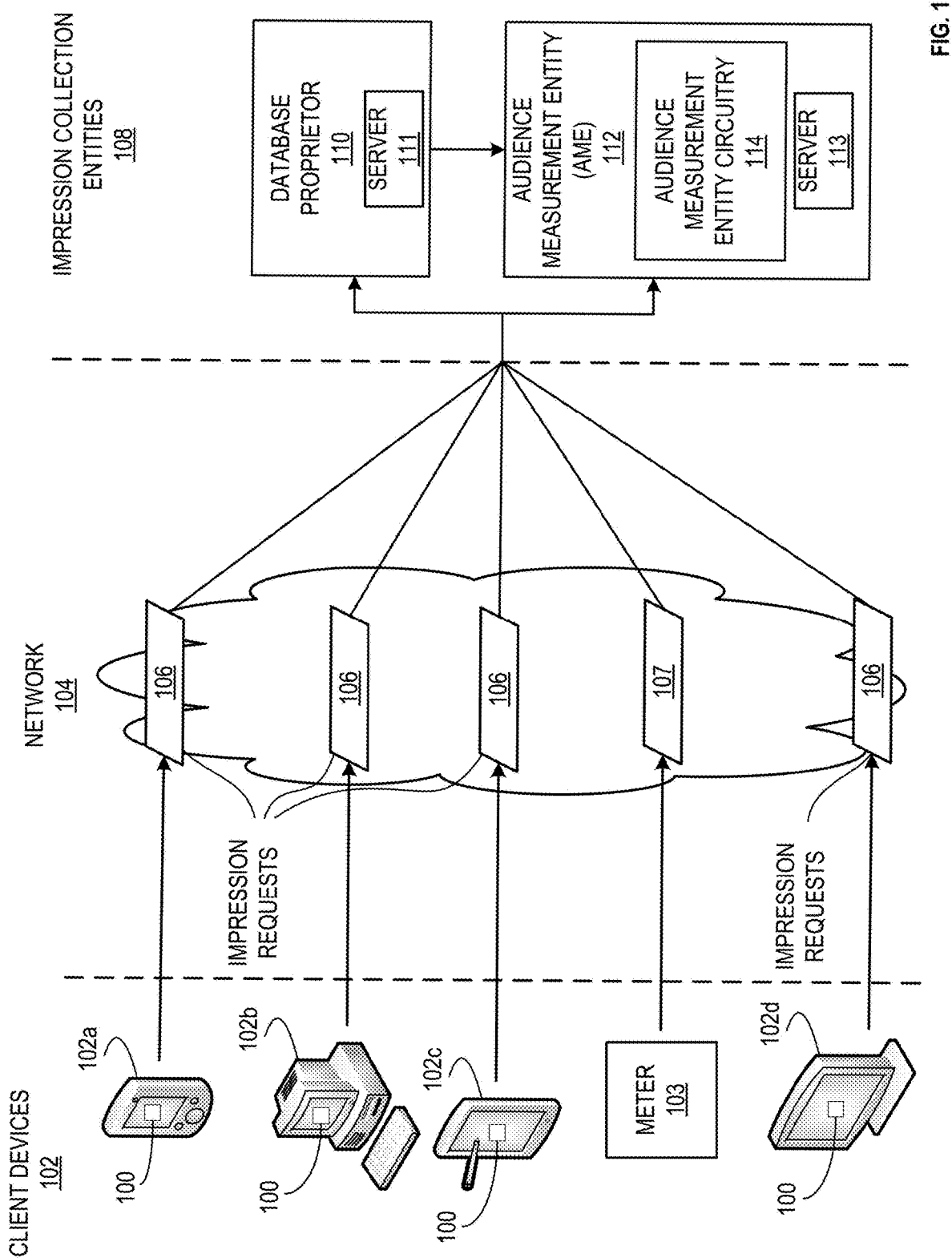
FIG. 1 illustrates example impression collection entities that log impressions based on client devices accessing different Internet-based media across demographics, platform combinations, and networks.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as advertisements and/or content, via digital television, desktop computers, mobile devices, etc. have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache.

Monitoring instructions cause monitoring data reflecting information about an access to the media (e.g., a media impression) to be sent from the client that downloaded the media to a monitoring entity in association with user identifying and/or device identifying information (e.g., a cookie). Sending the monitoring data from the client to the monitoring entity is known as an impression request (e.g., a hypertext transfer protocol (HTTP) request representing a media impression). Typically, the monitoring entity is an audience measurement entity (AME) that did not provide the media to the client and who is a trusted (e.g., neutral) third party for providing accurate usage statistics (e.g., The Nielsen Company, LLC).

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietor to recognize their subscribers when they visit their web site.

The protocols of the Internet make cookies inaccessible outside of the domain (e.g., Internet domain, domain name, etc.) on which they were set. Thus, a cookie set in, for example, the facebook.com domain is accessible to servers in the facebook.com domain, but not to servers outside that domain. Therefore, although an AME might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar et al. accomplish this task by structuring the AME to respond to impression requests from clients (who may not be a member of an audience member panel and, thus, may be unknown to the audience member entity) by redirecting the clients from the AME to a database proprietor, such as a social network site partnered with the audience member entity, using an impression response. Such a redirection initiates a communication session between the client accessing the tagged media and the database proprietor. For example, the impression response received from the AME may cause the client to send a second impression request to the database proprietor. In response to receiving this impression request, the database proprietor (e.g., Facebook) can access any cookie it has set on the client to thereby identify the client based on the internal records of the database proprietor. In the event the client corresponds to a subscriber of the database proprietor, the database proprietor logs/records a database proprietor demographic impression in association with the client/user.

As used herein, an impression is defined to be an event in which a home or individual accesses media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or television may be exposed to the same media via multiple devices (e.g., two or more of a mobile device, a tablet, a laptop, etc.) and/or via multiple media types (e.g., digital media available online, digital TV (DTV) media temporarily available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a census measurement science (CMS) tag executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is used to adjust cross-platform media exposure totals so that a single audience member is not counted multiple times for multiple exposures to the same media delivered/accessed via different media-delivery platforms.

As used herein, a unique audience (e.g., a unique audience size, deduplicated audience size, or audience size) is based on audience members distinguishable from one another. That is, a particular audience member exposed to particular media is measured as a single unique audience member regardless of how many times that audience member is exposed to that particular media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors (DPs), custom date ranges, custom combinations of assets and platforms, etc. Some deduplication techniques used by an AME perform deduplication across DPs using additional systems (e.g., Audience Link, etc.). For example, such deduplication techniques match or probabilistically link personally identifiable information (PII) from each source. Such deduplication techniques require storing or exporting massive amounts of user data, using approximations instead of direct measurement or calculating audience overlap for all possible combinations, neither of which are desirable. Example PII data may include a user name, an email address, a name, a street address, a telephone number, a government-issued identifier, or any other information that can be used to directly or indirectly obtain or infer an identity of a person associated with the PII data. For example, PII data can be used to represent and/or access audience demographics (e.g., geographic locations, ages, genders, etc.).

Advertisers want to understand ways to reach customers. The evolution of content delivery mechanisms makes it more difficult for media owners and distributors to maximize the values of their assets. Accordingly, examples disclosed herein measure advertisements and media across a changing ecosystem of media-delivery mechanisms to enable discovery of an audience incrementally. Examples disclosed herein create granular audience estimates that maximize the quality and confidence in the measurement across the ever fragmenting hierarchy. Examples disclosed herein use a combination of single source direct panel observations, predictive models (e.g., also referred to as priors), census-based observations, etc. to reflect relative confidence of the sources. Examples disclosed herein determine unique audience totals for media across different combinations of platforms (e.g., television only, addressable television only, connected television (CTV) only, computer only, mobile only, television and addressable television, television and connected television, . . . , and a combination of television, addressable television, connected television, computer, and mobile) for different demographics across screens, providers, etc. As used herein, television or linear television corresponds to traditional televisions (e.g., where video is broadcast via a cable provider, satellite provider, and/or antenna) and/or over-the-top (OTT) televisions (where video is broadcast via the Internet), connected televisions correspond to televisions that offer multimedia support and can connect to the Internet, and addressable televisions correspond to televisions that enable advertisers to selectively segment television audiences and serve different advertisements within a common program or navigation screen. Additionally or alternatively, examples disclosed herein may be utilized with any combination of platforms. Examples disclosed herein include panel circuitry to directly observer deduplicated audience across platforms in a panel, priors circuitry to model deduplication estimates based on historical campaign data and/or other relevant inputs, and census circuitry to calculate census-level deduplication. Examples disclosed herein also include integration circuitry to combine estimates of the panels circuitry, the priors circuitry, and the census circuitry and adjust to ensure that odds ratios across platforms are preserved. Examples disclosed herein also include alignment circuitry to receive final posterior deduplication estimates and upstream platform data to generate an output based on an optimization problem. The disclosed examples may determine unique audience totals and/or probability distributions. In examples disclosed herein, a unique audience total corresponds to the total number of deduplicated audience members exposed to the media for different platform combinations, demographics, publishers, etc. In examples disclosed herein, a probability distribution corresponds to a probability of someone being exposed to media for different platform combinations, demographics, publishers, etc. Unique audience totals and probability distributions can be used interchangeably throughout. For example, unique audience totals can be converted to probability distributions by dividing the unique audience totals by a universe estimate and probability distributions can be converted to unique audience totals by multiplying the probability distributions by the universe estimate.

As the number of publishers (e.g., Google, Roku, etc.) and the number of platforms expand, the number of unique audience total estimates across publishers, demographics, and/or platforms exponentially expands. For example, unique audience totals for each platform combination (e.g., tv only, tv and mobile only, all platforms, etc.) across two publishers for four platforms will result in over 27,000 estimates that are logically consistent across platform combinations. Examples disclosed herein provide a scalable approach that can estimate logically consistent estimates for a growing number of publishers and platforms.

FIG. 1 illustrates example client devices 102 that report audience impression requests for Internet-based media 100 to impression collection entities 108 to identify a unique audience and/or a frequency distribution for media. The illustrated example of FIG. 1 includes the example client devices 102, an example meter 103, an example network 104, example impression requests 106, example metering data 107, and the example impression collection entities 108. As used herein, an impression collection entity 108 refers to any entity that collects impression data such as, for example, an example AME 112 and/or an example database proprietor 110. In the illustrated example, the example database proprietor 110 includes an example server 111 and the AME 112 includes an example server 113 and example audience measurement entity circuitry 114.

The example client devices 102 of the illustrated example may be any device capable of accessing media over a network (e.g., the example network 104). For example, the client devices 102 may be an example mobile device 102a, an example computer 102b, an example tablet 102c, an example smart television 102d, and/or any other Internet-capable device or appliance. Examples disclosed herein may be used to collect impression information for any type of media including content and/or advertisements. Media may include advertising and/or content delivered via websites, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming, on-demand video and/or audio). Traditionally, content is provided at little or no cost to the audience because it is subsidized by advertisers that pay to have their advertisements distributed with the content. As used herein, "media" refers collectively and/or individually to content and/or advertisement(s).

Figure 2:
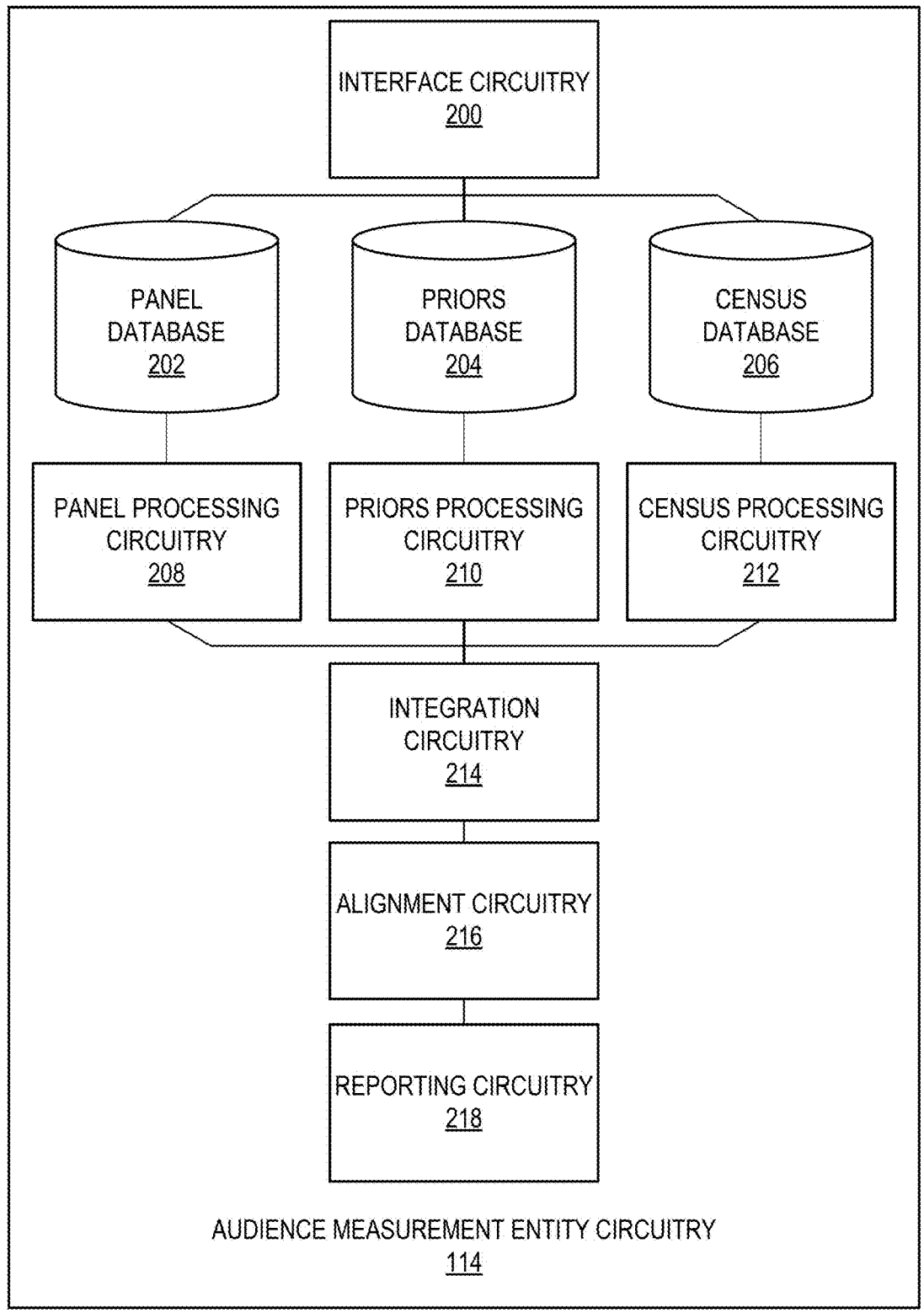
FIG. 2 is a block diagram of example audience measurement entity circuitry of FIG. 1.

Additionally, the example client devices 102 of FIG. 2 include the example meter 103. The meter 103 may be a software meter or a personal people meter that a panelist agrees to use to monitor the panelist's accesses to media. For example, the meter 103 may be software implemented on one or more of the client devices 102 to determine the media accessed by the client device 102 and transmit (e.g., periodically, aperiodically, and/or based on a trigger) the determined media access information to the AME 112. In some examples, the meter 103 is a personal people meter that includes a sensor (e.g., a microphone, camera, etc.) that extracts watermarks (also referred to as codes and/or ancillary codes) from audio and/or video. A watermark is a code placed in the media for media monitoring/identification purposes that the sensor can identify but cannot be seen or heard by a panelist. For example, a code may be embedded in frequencies of the audio in a manner that cannot be heard with human ears. In this manner, the meter 103 can identify the code to identify the media and/or send the identified code to the example AME 112 (e.g., via the network 104), and the AME 112 can identify the media. Additionally or alternatively, the meter 103 may generate signatures (also referred to as fingerprints) from audio and/or video. A signature corresponds to characteristics (e.g., frequency, pitch, timbre, and/or any other characteristic of the audio that can be used to identify the audio) of the audio and/or video itself. In this manner, the meter 103 can generate the signature based on the characteristics and/or the audio/video itself and transmit the signature to the AME 112. The AME 112 includes a database of reference signatures and corresponding media. In this manner, the AME 112 can identify the media corresponding to the generated signature by matching the generated signatures to a reference signature stored in the database of signatures. In some examples, the meter 103 is a streaming meter that transmits impression requests (e.g., notifications of occurrences of impressions) collected based on accesses of media via a network router. For example, the meter 103 can monitor home network activity (e.g., traffic via the router) in a home and capture identifiers generated by SDK application or through HTML tags. The identifier may also be included in census data along with other metadata from Internet media monitoring (e.g., digital ad ratings (DAR)) tags to the home. As further described below, the AME 112 can link the Internet media monitoring tags to the home via a mapping protocol. The meter 103 transmit the impression requests corresponding to media accesses to the AME 112 via the network 104. The example AME 112 can keep a record of media accessed by one or more panelists based on the information obtained from the meter 103. Although FIG. 1 includes one meter 103 and four computing devices 102a-102d, examples disclosed herein may be implemented using any number of meters and/or computing devices.

The example network 104 is a communications network. The example network 104 allows the example impression requests 106 and/or metering data 107 (e.g., extracted watermarks and/or generated signatures, media identifiers, etc.) from the example client devices 102 to the example impression collection entities 108. The example network 104 may be a local area network, a wide area network, the Internet, a cloud, or any other type of communications network.

The impression requests 106 of the illustrated example include information about accesses to the media 100 at the corresponding client devices 102 generating the impression requests. Such impression requests 106 allow monitoring entities, such as the impression collection entities 108, to log a number of media impressions for different media accessed via the client devices 102. By logging media impressions, the impression collection entities 108 can generate media impression quantities for different media (e.g., different content and/or advertisement campaigns).

The impression collection entities 108 of the illustrated example include the example database proprietor 110 and the example AME 112. In the illustrated example, the example database proprietor 110 may be one of many database proprietors that operate on the Internet to provide services to subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), and/or any other site that maintains user registration records.

In some examples, execution of the monitoring corresponding to the media 100 causes the client devices 102 to send the impression requests 106 to the servers 111, 113 (e.g., accessible via an Internet protocol (IP) address or uniform resource locator (URL)) of the impression collection entities 108. In some examples, the monitoring instructions cause the client devices 102 to provide device and/or user identifiers and media identifiers in the impression requests 106. The device/user identifier may be any identifier used to associate demographic information with a user or users of the client devices 102. Example device/user identifiers include cookies, hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), an Ad ID (e.g., an advertising ID introduced by Apple, Inc. for uniquely identifying mobile devices for purposes of serving advertising to such mobile devices), third-party service identifiers (e.g., advertising service identifiers, device usage analytics service identifiers, demographics collection service identifiers), etc. In some examples, fewer or more device/user identifier(s) may be used. The media identifiers (e.g., embedded identifiers, embedded codes, embedded information, signatures, etc.) enable the impression collection entities 108 to identify media (e.g., the media 100) objects accessed via the client devices 102. The impression requests 106 of the illustrated example cause the AME 112 and/or the database proprietor 110 to log impressions for the media 100. In the illustrated example, an impression request 106 is a reporting to the AME 112 and/or the database proprietor 110 of an occurrence of the media 100 being accessed at the client device 102. The impression requests 106 may be implemented as a hypertext transfer protocol (HTTP) request. However, whereas a transmitted HTTP request identifies a webpage or other resource to be downloaded, the impression requests 106 include audience measurement information (e.g., media identifiers and device/user identifier) as its payload. The server 111, 113 to which the impression requests 106 are directed is programmed to log the audience measurement information of the impression requests 106 as an impression (e.g., a media impression such as advertisement and/or content impressions depending on the nature of the media accessed via the client device 102). In some examples, the server 111, 113 of the database proprietor 101 or the AME 112 may transmit a response based on receiving an impression request 106. However, a response to the impression request 106 is not necessary. It is sufficient for the server 111, 113 to receive/obtain (via one or more wireless communications) the impression request 106 to log an impression. As such, in examples disclosed herein, the impression request 106 is a dummy HTTP request for the purpose of reporting an impression but to which a receiving server need not respond to the originating client device 102 of the impression request 106. Additionally or alternatively, the server 113 of the AME 112 obtains metering data from the meter 103. The example AME 112 can identify media exposure from one or more panelists associated with the meter 103 based on the metering data. For example, if the metering data includes extracted watermarks and/or generated signatures, the AME 112 can attempt to match the watermark and/or signature to reference watermarks and/or signatures in one or more reference databases to identify the media. After finding a match, the AME 112 can log the accesses of the media for the panelist and/or demographics of the panelist along with a timestamp (e.g., which may be included in the metering data and/or based on the time the metering data was obtained).

The example database proprietor 110 maintains user account records corresponding to users registered for services (such as Internet-based services) provided by the database proprietors. That is, in exchange for the provision of services, subscribers register with the database proprietor 110. As part of this registration, the subscribers provide detailed demographic information to the database proprietor 110. Demographic information may include, for example, gender, age, ethnicity, income, home location, education level, occupation, etc. In the illustrated example, the database proprietor 110 sets a device/user identifier on a subscriber's client device 102 that enables the database proprietor 110 to identify the subscriber.

In the illustrated example, the example AME 112 does not provide the media 100 to the client devices 102 and is a trusted (e.g., neutral) third party (e.g., The Nielsen Company, LLC) for providing accurate media access (e.g., exposure) statistics. The example AME 112 includes the example audience measurement entity circuitry 114. As further disclosed herein, the example audience measurement entity circuitry 114 determines unique audience totals for media across different combinations of platforms (e.g., television only, addressable television only, connected television only, computer only, mobile only, television and addressable television, television and connected television, . . . , and a combination of television, addressable television, connected television, computer, and mobile) for different demographics across screens, providers, etc. In some examples, the AME 112 includes additional circuitry to adjust data obtained from the database proprietor 110. For example, the AME 112 may adjust the impressions data from the database proprietor based on known misattribution and/or co-viewing events from the panel data to make the database proprietor data more accurate.

In operation, the example client devices 102a-d employ web browsers and/or applications (e.g., apps) to access media. Some of the web browsers, applications, and/or media include instructions that cause the example client devices 102a-d to report media monitoring information to one or more of the example impression collection entities 108. That is, when the client device 102a-d of the illustrated example accesses media, a web browser and/or application of the client device 102a-d executes instructions in the media, in the web browser, and/or in the application to send the example impression request 106a-d to one or more of the example impression collection entities 108 via the network (e.g., a local area network, wide area network, wireless network, cellular network, the Internet, and/or any other type of network). The example impression requests 106 of the illustrated example include information about accesses to the media 100 and/or any other media at the corresponding client devices 102a-d generating the impression requests 106. Such impression requests allow monitoring entities, such as the example impression collection entities 108, to collect media impressions for different media accessed via the example client devices 102a-d. In this manner, the impression collection entities 108 can generate media impression quantities for different media (e.g., different content and/or advertisement campaigns). Additionally, the example meter 103 generates the metering data 107 based on extracted watermarks and/or generated signatures and transmits the metering data 107 to the AME 112. The metering data 107 includes information about accesses to media that may include corresponding timestamps. The metering data 107 allows the AME 112 to determine media exposure data corresponding to one or more panelists and log the media exposure in conjunction with the one or more panelists and/or demographics of the one or more panelists.

When the server 111 of the example database proprietor 110 receives the example impression request 106 from the example client device 102, the example database proprietor 110 requests the client device 102 to provide a device/user identifier that the database proprietor 110 had previously set for the example client device 102. The example database proprietor 110 uses the device/user identifier corresponding to the example client device 102 to identify the subscriber of the client device 102. The server 111 of the example database proprietor 110 transmits logged impression information to the example AME 112. In some examples, the database proprietor 110 determines unique audience total(s) for one or more margins and/or one or more unions of the one or more margins using one or more techniques. As used herein a margin is a subgroup of a union. For example, if 24 demographics of panelists are monitored, the total audience of each of the 24 demographics represent 24 margins of a union corresponding to a publisher set. The combinations of unions corresponding to publisher sets correspond to a union reflecting the total campaign. In such examples, the server 111 of the database proprietor 110 may transmit the unique audience total(s) to the example AME 112.

The example server 113 of the AME 112 receives database proprietor demographic impression data from the server 111 of the example database proprietor 110 and/or obtains impressions 106 directly from the one or more client devices 102a-d. Additionally or alternatively, the server 113 receives the metering data 107 from the meter 103. The database proprietor demographic impression data may include information relating to a total number of the logged database proprietor impressions that correspond to a registered user of the database proprietor 110 and/or any other information related to the logged database proprietor impressions (e.g., demographics, a total number of registered users exposed to the media 100 more than once, etc.). The example audience measurement entity circuitry 114 determines unique audience totals for media across different combinations of platforms (e.g., television only, addressable television only, connected television only, computer only, mobile only, television and addressable television, television and connected television, . . . , and a combination television, addressable television, connected television, computer, and mobile) for different demographics across screens, providers, etc., as further described below in conjunction with FIG. 2.

FIG. 2 illustrates an example block diagram of example audience measurement entity circuitry 114 of FIG. 1. The example audience measurement entity circuitry 114 includes example interface circuitry 200, an example panel database 202, an example priors database 204, an example census database 206, example panel processing circuitry 208, example priors processing circuitry 210, example census processing circuitry 212, example integration circuitry 214, example alignment circuitry 216, and example reporting circuitry 218. In some examples, the components of the audience measurement entity circuitry 114 are connected via a bus.

The example audience measurement entity circuitry 114 of FIG. 2 is a computing device and/or processing device that is capable of storing datasets (e.g., panel data, priors data, census data, etc.), determining unique audience totals for media across different combinations of platforms for different demographics across screens, providers, etc., and generating a report based on the determined unique audience totals. The audience measurement entity circuitry 114 may be a computer, a server, and/or any other computing device. In some examples, the audience measurement entity circuitry 114 may include more or fewer components than those shown in the example of FIG. 2. For example, the example audience measurement entity circuitry 114 may include a user interface to display results of the determined unique audience totals.

The interface circuitry 200 of FIG. 2 may include one or more interfaces to obtain and/or access the data obtained from the example server 113 (e.g., via a bus or other connection). For example, the interface circuitry 200 may obtain logged demographic impression information, media access information, census data, etc. Additionally, the interface circuitry 200 may transmit and/or store generated reports corresponding to results of the unique audience totals to other devices (e.g., by causing a transmitter, transmission circuitry, and/or the server 113 to transmit the report to another device via a wired or wireless communication).

The example panel database 202 of FIG. 2 is a storage device (e.g., memory, storage, etc.) that includes media access data related to a panel of panelists. The panelist data may include data related to panelist exposure to media using different platforms (e.g., linear TV impressions and/or unique audience total(s), addressable TV impressions and/or unique audience total(s), digital advertisement rating (DAR) impressions and/or unique audience total(s), campaign metadata, etc.). In some examples, the panelists' data includes PII matches of panel (e.g., national people meter (NPM)) information and demographic impressions or NPM information and digital advertisement rating (DAR) tags collected via the meter 103 of FIG. 1. For example, the AME 112 may match (e.g., daily, monthly, etc.) PII information of panelists to demographic impressions from the example database proprietor 110 based on common identifiers, demographics, timestamps, etc. The example priors database 204 of FIG. 2 stores historical data related to prior campaigns (e.g., historical linear TV impressions and/or unique audience total(s), historical addressable TV impressions and/or unique audience total(s), historical DAR impressions and/or unique audience total(s), historical campaign metadata, etc.). For example, the priors database 204 may include media access information and/or unique audience totals previously performed for a previous media exposure campaign. The example census database 206 of FIG. 2 stores obtained access data. Census data may include information provided by panelists.

The example panel processing circuitry 208 of FIG. 2 processes panel information to generate a probability distribution based on two-way platform relationship total audience data (e.g., the deduplicated audience totals of exactly two platforms, television and mobile, for example). For example, the panel processor circuitry 208 can create a number of demographic bucket counts (e.g., 16 bucket counts) based on observed data from which a probability distribution can be constructed. As further described below, the example priors processing circuitry 210 can determine the odds ratios for the two-way platform relationships. In some examples, the panel processing circuitry 208 creates a sample (e.g., a subgroup) of active panelist household members based on PII matches of the panel to impressions collected via the meter 103 (e.g., Internet media monitoring data to be mapped to panelist through a mapping process). The panel processing circuitry 208 projects (e.g., weights) the sample to reflect the television/digital universe. For example, the sample may only include a limited number or percentage of the total audience. Accordingly, the panel processing circuitry 208 weights the media access data of the panelists to reflect the population (e.g., weighting the media access data of one panelist to represent 1,000 audience members). The panel processing circuitry 208 may correct the sample data for misattributions and/or co-viewing. Misattribution exists when a household having multiple people that use the same client device (e.g., the same computer, tablet, smart internet appliance, mobile computing device) transmits impressions corresponding to the wrong user. For example, collected impressions from that client device may be misattributed to a member of the household that is not the current user of the client device. That is, when an online user visits a website and is exposed to an advertisement (or other media) on that site that has been tagged with beacon instructions, there is a redirect to a server of the database proprietor 110 (e.g., Facebook, Yahoo, Google, etc.) of FIG. 1. The database proprietor 110 then looks into the latest cookie in the web browser of that client device. The database proprietor 110 then attributes the impression to the user account corresponding to the cookie value. For example, the cookie value is one that was previously set in the client device by the database proprietor 110 as corresponding to a particular registered user account of the person logged into the website of that database proprietor 110 when the database proprietor 110 set the cookie. After collecting and attributing the impression to the user account associated with the retrieved cookie value, the database proprietor 110 aggregates the impressions and the audience based on the demographics associated with the user account. Accordingly, the example panel processing circuitry 208 corrects sample for misattribution. Co-viewing exists when two panelists access the media at the same time while only one panelist is credited for the media exposure. The example panel processing circuitry 208 leverages television meter as truth data to adjust CTV demographics assigned via a PII match. Additionally, the panel processing circuitry 208 assigns demographics to the streaming meter homes. Additionally, the panel processing circuitry 208 determines observed deduplication for the sample based on overlap counts. In some examples, the panel processing circuitry 208 implements one or more AI-based models (e.g., neural networks, machine learning models, etc.) to process the panel data. The example panel processing circuitry 208 is further described below in conjunction with FIG. 3.

The example priors processing circuitry 210 of FIG. 2 processes the priors information stored in and accessed from the example priors database 204 to generate a probability distribution (e.g., a probability that a person corresponding to one or more demographics accessed media for a particular combination of platform) that estimates audience deduplication across platforms based on observed and model historical data. For example, the priors processing circuitry 210 leverages pairwise relationships based on odds ratios incorporated into a Bayesian methodology. Odds ratio estimation ensures that two-way platform relationships from historical data are maintained through the integration of the panels, prior, and census data. In some examples, the priors processing circuitry 210 can be estimated from campaigns that do not run on four or five platforms. The odds ratio estimation allows posterior audience deduplication estimates using historical and live campaign data and are relatively stable day-over-day. In some examples, the prior processing circuitry 210 stores (e.g., into memory, storage, a database, the priors database 204, etc.) determined odds ratios for future use as historical odds ratios for platform combination pairs. After the priors processing circuitry 210, the example priors processing circuitry 210 approximates a prior distribution and a likelihood distribution based on the odds ratios. The example priors processing circuitry 210 combines the prior and likelihood distribution and provides the combined distribution to the integration circuitry 214. In some examples the priors processing circuitry 210 implements one or more AI-based models to process the priors data. For example, an AI-based model may be trained to predict a distribution (e.g., probability and/or unique audience total(s)) for each platform combination and/or vectors of deduplication counts for all reporting levels based on input features (e.g., historical estimates of unique audience by platform, demographic data, campaign metadata, etc.) using training data (e.g., historic panel audience exposure data by platform combination not for a campaign). In some examples, the priors processing circuitry 210 implements one or more models to associate logged Internet media monitoring data to a panelist in a home. For example, a router at a panelists home may send an impression request to the AME 112. However, the AME 112 may not know which panelist in the home corresponding to the router was exposed to the media. In such an example, the prior processing circuitry 210 can implement a model based on heuristics, probabilities and optimization to associate the impression to a panelist. In some examples, the panel processing circuitry 208 implements the one or more models to associate the logged Internet media monitoring data to a panelist in a home. The example prior processing circuitry 210 is further described below in conjunction with FIG. 4.

The example census processing circuitry 212 of FIG. 2 processes census data to generate a probability distribution based on a census deduplicated audience. For example, the census processing circuitry 212 can leverage device identifiers captured by AME tags to match person-level device clusters within an AME-based identifier system. The example census processing circuitry 212 can utilize datasets and algorithms to identify audience duplication at a person level within live campaigns based on the census data. For example, the census processing circuitry 212 can generate a persons/household graph based on historical impressions data and historical panel PII data to determine an observed deduplication error. Additionally, the census processing circuitry 212 can generate a persons/household graph based on census impressions data and census PII data to determine an observed overlap. The example census processing circuitry 212 can combine the observed deduplication error and overlap to generate a unification of sample, weight the sample, and forward propagation of errors to generate a corrected census deduplication audience.

The example integration circuitry 214 of FIG. 2 obtains and combines the probability distributions from the panel processing circuitry 208, the priors process circuitry 210, and the census processing circuitry 212. Additionally, the integration circuitry 214 uses a sequential odds ratio insertion (SOI) technique to adjust the combined estimates to ensure that the odds ratios across the platforms are preserved. For example, the example integration circuitry 214 odds ratios generated by the priors processing circuitry 210, generates and iteratively updates a probability vector corresponding to unique audience estimates across platforms while ensuring that the two-by-two platform relationships are preserved. In some examples, the integration circuitry 214 is implemented by an AI-based model that is trained to obtain odds ratios for two-way platform combinations and output N-way platform combinations for the N platforms. The integration circuitry 214 is further described below in conjunction with FIG. 5.

The example alignment circuitry 216 of FIG. 2 aligns the deduplicated audience totals across the platforms, demographics, and publishers. For example, the alignment circuitry 216 uses a constrained optimization algorithm to (a) estimate row by row unique audience totals using marginals as constraints and integration model output as a prior and (b) separately ensure logical consistency across levels of aggregation using logical constraints. The alignment circuitry 216 utilizes an entropy-based technique constrained by marginals, as shown in the below Equation 1.

$$\sum_{i=1}^{n} p_i \cdot \log\left(\frac{p_i}{q_i}\right) \text{ subject to } p_i \cdot \geq 0, \sum_{i=1}^{n} p_i \cdot = 1, \text{ and} \quad \text{(Equation 1)}$$

$$\sum_{i=1}^{n} p_i \gamma_{ij} = \alpha_j \text{ for } 1 \leq j \leq m$$

In the above-Equation 1, $p_i$ are selected probabilities used to generate the final probability distribution across demographics, publishers, and/or platforms, qi corresponds to the probability distribution output by the integration circuitry 214, $\gamma_{ij}$ represents the weights used to represent the total audience and $\alpha_j$ represents the total reach of the media, and m represents the number of constraints. The alignment circuitry 216 select values of $p_i$ that most closely align to the prior distribution (e.g., the output of the integration circuitry 214). Although a relative entropy technique is used, any type of entropy technique may likewise be used. The example alignment circuitry 216 may perform multiple iterations for the different $p_i$ that satisfy constraints (e.g., XX) and select the set of $p_i$ values that result in the smallest sum. The number of iterations may be preset or may be based on the result of one or more previous iterations. For example, if each iteration results in a lower sum, but the difference between two or more iterations is less than a threshold, the alignment circuitry 216 may stop performing iterations (e.g., because the sum is sufficiently minimized). Additionally, the alignment circuitry 216 performs a linear optimization technique to vertically align the audience totals to ensure vertical logical consistency. The output of the maximum entropy may have vertical inconsistencies when audience totals and/or probabilities of one or more margins are above the audience totals and/or probabilities of the union of the margins or the sum of the unique audience totals and/or probabilities of the margins is lower than the unique audience totals and/or probabilities. For example, the probability of accessing to media via television across all networks being less than the probability of accessing to media via television for one network is not logically consistent. Accordingly, the example alignment circuitry 216 performs a linear optimization which minimizes the distance from the original maximum entropy estimates but is subject to the reporting logic constraints and upholds the marginals.

In some examples, the alignment circuitry 216 performs cross provider processing. For example, the results of the unique audience sizes and/or probability distribution are based on multiple publishers. As such, the alignment circuitry 216 may determine deduplication estimates across different publishers (e.g., google CTV and Facebook mobile). In some examples, the alignment circuitry 216 performs an independent deduplication to determine the cross provider deduplication total(s). In some examples, the alignment circuitry 216 uses odds ratio(s) and/or a Frechet ratio technique to determine the cross provider deduplication total(s) using aggregate marginal data.

The example reporting circuitry 218 of FIG. 2 generates a report that includes the probability distribution and/or unique audience totals output by the alignment circuitry 216 based on the panel data, priors, and/or census data. For example, the reporting circuitry 218 can generate a report that corresponds to the information output by the example alignment circuitry 216. In some examples, the reporting circuitry 218 stores the generated report in memory. In some examples, the reporting circuitry 218 causes output of the information corresponding to the report. For example, the reporting circuitry 218 can cause the information corresponding to the report to be output via a user interface or transmitted to another device (e.g., using the interface circuitry 200 and/or the server 113) via a wired or wireless communication.

Figure 3:
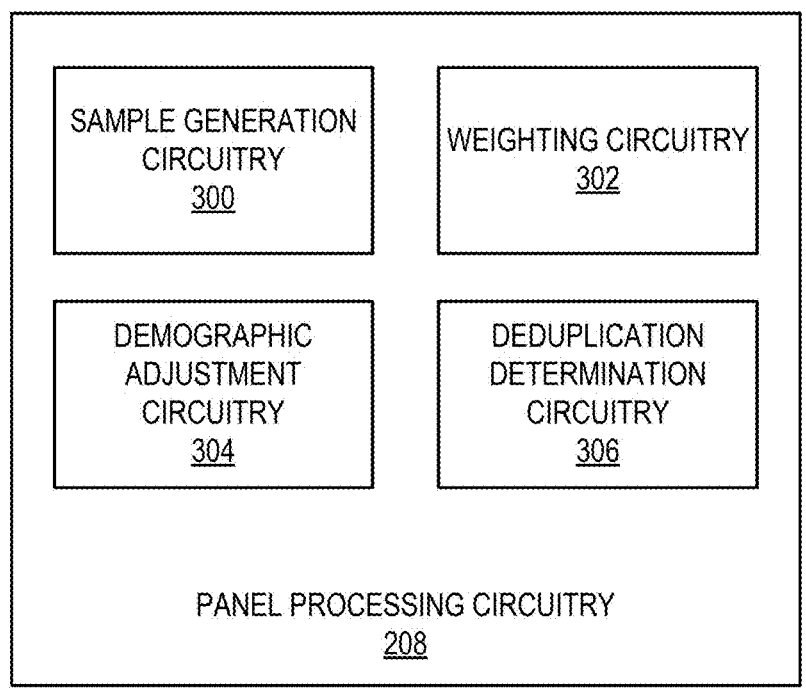
FIG. 3 is a block diagram of example panel processing circuitry of FIG. 2.

FIG. 3 is a block diagram of an example implementation of the panel processing circuitry 208 of FIG. 2. The example panel processing circuitry 208 includes example sample generation circuitry 300, example weighting circuitry 302, example demographic adjustment circuitry 304, and example deduplication determination circuitry 306.

The example sample generation circuitry 300 of FIG. 3 accesses the panel data from the example panel database 202 of FIG. 2 to generate a sample of active household members. In some examples, the sample generation circuitry 300 generates the sample based on PII matches of panel members to demographic impressions from the database proprietor 110 of FIG. 1 or based on unique audience identifier (UAID) matches of homes of panel members to tags collected via a streaming meter. The example sample generation circuitry 300 may match PII of panelists to database proprietor users periodically (e.g., monthly), aperiodically, and/or based on a trigger. The example sample generation circuitry 300 may match UAID of streaming meter homes to tags (e.g., daily), aperiodically, and/or based on a trigger. The sample that the sample generation circuitry 300 generates may include database proprietor/panelist matches and panelists with streaming meters installed in their homes. To define the universe of users, the sample generation circuitry 300 identifies television panelists with at least one digital device. As used herein, a digital device is defined as an internet connected desktop, smartphone, tablet, connected television, etc.

The example weighting circuitry 302 of FIG. 3 weights the sample to project the sample to the TV/digital universe of users to better reflect the population of users. The example weighting circuitry 302 of FIG. 3 generates weights for the sample to re-balance the demographic representation so that the demographics of the sample match the demographics of the universe of users (e.g., to align the sample to the television/digital universe).

The example demographic adjustment circuitry 304 corrects for misattribution and/or co-viewing of CTV measurement for the PII matches. Misattribution occurs when a first member of a household uses a digital device to log into a website associated with a database proprietor 110 (FIG. 1) and accesses first media at a first time and later, while the first member is still logged in, a second member of the household uses the digital device and accesses second media at a second time. In this manner, an impression associated with the second media is sent to the database proprietor 110 associated with the first member because the first member was logged in, even though the second member actually accessed the second media. A co-viewing event occurs when the first member of the household uses the digital device to log into a website associated with the database proprietor 110 and accesses media with a second member of the household. In this manner, an impression (e.g., corresponding to an Internet media access on a CTV) associated with the media is sent to the database proprietor 110 associated with the first member because the first member was logged in, even though the second member was also present when the media was accessed. The example demographic adjustment circuitry 304 leverages TV metering data as truth data to adjust CTV demographics assigned to a match to correct misattribution and co-viewing events. For example, the demographic adjustment circuitry 304 accesses CTV digital exposure data (e.g., which may be provided by the database proprietor XX of FIG. 1) and matches the CTV digital data with panel data. If there is a discrepancy between the CTV digital data and the panel data (e.g., the CTV data corresponds to a person being the only one to watch a show with the panel data indicates that it was actually two people or a different person), the digital adjustment circuitry 304 the person assignment based on the panel data.

Additionally, the example demographic adjustment circuitry 304 of FIG. 3 links and/or associates household impressions to particular panelists to be able to assign demographics to streaming meter homes. In some examples a streaming meter monitors media accesses via a network router. In this manner, media monitoring data of a household can be obtained. However, if there are multiple people in the household, it may not be known which person of the household and/or which device in the household was responsible for accessing the media. Accordingly, the example demographic adjustment circuitry 304 links streaming meter data to demographics of panelist s by connecting Internet-based media to in-home streaming meter data via a UAID. Devices connected to a television are assigned to a panelist's viewing via a television prompt to identify the panelist. However, for devices not connected to a television, the demographic adjustment circuitry 304 maps a panelist's device to a streaming meter via a device identifier. Additionally, the demographic adjustment circuitry 304 automatically assigns a panelist to a household size when the household members have unique platform and device types. In some examples, the demographic adjustment circuitry 304 may directly map computer/mobile devices to streaming meters. Additionally, the demographic adjustment circuitry 304 assigns the remaining household with no person assignment using a model (e.g., a device mapping model) to make data more useable for deduplication. The demographic adjustment circuitry 304 uses the model to assign probabilities for potential panelist devices in a household. The model is trained using training data that comes from mapped devices and deterministic assignments (e.g., from surveys). The demographic adjustment circuitry 305 uses the probabilities as scores for an assignment optimization. The demographic adjustment circuitry 305 may perform the device mapping model periodically and/or use previous assignments as a strong predictor to reduce assignment churn. An example of a device mapping model is further described below in conjunction with FIGS. 6 and 7.

The example deduplication determination circuitry 306 of FIG. 3 generates observed deduplication information for demographics across different platform combinations. For example, the deduplication determination circuitry 306 determines all possible campaign platform overlaps within a panel. The example deduplication determination circuitry 306 aggregates overlap results (e.g., platform combinations) per reporting requirements. The example deduplication determination circuitry 306 may convert aggregated overlaps into parameters of a probability distribution (e.g., by dividing the weighted observed deduplication results by the universe estimate). The observations of the panel via the deduplication determination circuitry 306 inform final deduplication estimates in multiple ways depending on the campaign size. For example, campaigns may use panel observations to estimate campaign-specific odds ratios (e.g., for 2-way platform deduplication). Large campaigns may also forward inferred model parameters (e.g., Dirichlet Alphas) to an integration step of the alignment circuitry 216.

Figure 4:
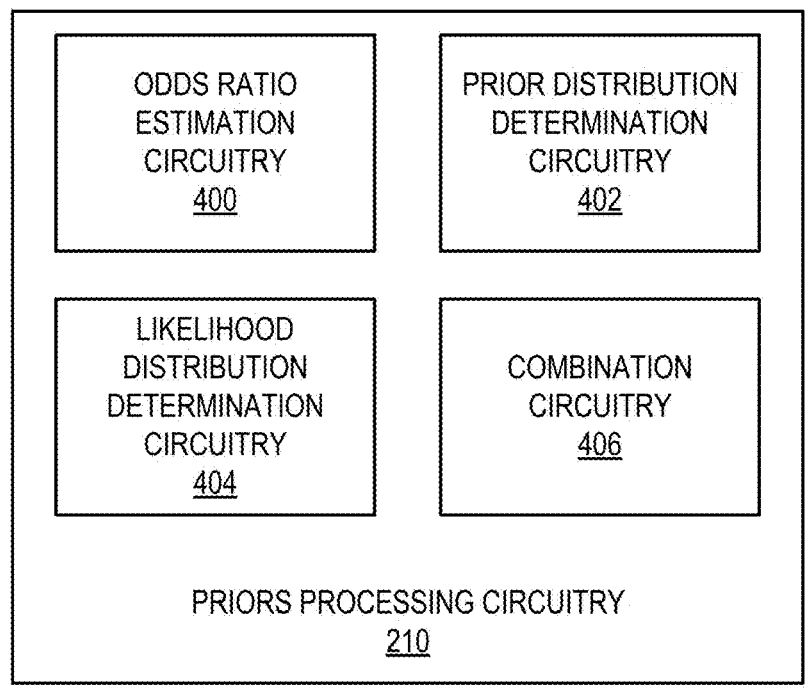
FIG. 4 is a block diagram of example priors processing circuitry of FIG. 2.

FIG. 4 is a block diagram of an example implementation of the priors processing circuitry 210 of FIG. 2. The example priors processing circuitry 210 includes example odds ratio estimation circuitry 400, example prior distribution determination circuitry 402, example likelihood distribution determination circuitry 404, and the example combination circuitry 406.

The example odds ratio estimation circuitry 400 of FIG. 4 determines odds ratios for two-way platform combinations of a campaign while ensuring that the two-way platform relationships from historical data is maintained (e.g., through SOI in the integration step performed by the alignment circuitry 216, as further described above). The example odds ratio estimation circuitry 400 can estimate odds ratios to allow for posterior audience deduplication estimates using historical and live campaign data and is stable day-to-day. An odds ratio quantifies the strength of the association between two events (e.g., A and B). Event A may be an access of an advertisement on platform A and event B may be an access of an advertisement on platform B. The example odds ratio estimation circuitry 400 determines odds ratios using Equation 2 below.

$$\text{odds ratio} = \frac{\frac{yy}{yn}}{\frac{ny}{nn}} \qquad \text{(Equation 2)}$$

In the above Equation 2, yy represents a total number of people that accessed a media item on platform A and platform B, yn represents a total number of people that accessed the media on platform A only, ny represents a total number of people that accessed the media on platform B only, and nn represents a total number of people that did not access the media on either platform. For example, if there are 5 people that accessed media on television and mobile, 10 people that accessed the media on only television, 5 people that accessed the media on only mobile, and 10 people that did not access the media on mobile or television, the example odds ratio estimation circuitry 400 determines the odds ratio to be 1 (e.g., (5/10)/(5/10)). An odds ratio of 1 suggests that the events are independent. An odds ratio greater than 1 suggests that there is more overlap between audiences across platforms A and B compared to independence (e.g., more duplication than independence). An odds ratio of less than 1 suggests that there is less overlap (e.g., less duplication than independence).

The example prior distribution determination circuitry 402 of FIG. 4 determines a prior distribution for each platform combination based on the logs odds ratios (e.g., the aggregated historical campaign data). For example, the prior distribution circuitry 402 can determine a standard error (e.g., σ) of the log of the odds ratio for a single advertisement campaign and mean (e.g., μ) for the single advertisement campaign using the below Equations 3 and 4.

$$\sigma_{prior} = \sqrt{\frac{1}{\sum\left(\frac{1}{\sigma_i^2}\right)}} \quad \text{(Equation 3)}$$

$$\mu_{prior} = \sigma_{prior}^2 * \sum\left(\frac{\mu_i}{\sigma_i^2}\right) \quad \text{(Equation 4)}$$

In the above Equations 3 and 4, σi is the standard error of the log odds ratio for an individual historical advertisement campaign and μi is the logs odds ratio for the individual historical advertisement campaign, which are calculated by the likelihood distribution determination circuitry 404, as further described below in conjunction with Equations 5 and 6.

The example likelihood distribution determination circuitry 404 of FIG. 4 determines a likelihood distribution for each platform combination based on the logs odds ratios (e.g., the current panelist counts). For example, the likelihood distribution determination circuitry 404 determines a standard error (e.g., σ) of the log of the odds ratio for a single advertisement campaign and mean (e.g., μ) for the single advertisement campaign using the below Equations 5 and 6.

$$\mu = \log\left[\frac{\frac{yy}{yn}}{\frac{ny}{nn}}\right] \quad \text{(Equation 5)}$$

$$\sigma = \sqrt{\left(\frac{1}{yy} + \frac{1}{yn} + \frac{1}{ny} + \frac{1}{nn}\right)} \quad \text{(Equation 6)}$$

The example combination circuitry 406 of FIG. 4 combines the prior and likelihood distributions. In some examples, the combination circuitry 406 relies more heavily on historical advertisement campaign data when the sample size from the panel is smaller (e.g., below a first threshold), while conversely relies less heavily on the historical data when the panel is larger (e.g., above a second threshold). The combination circuitry 406 combines the two distributions using the below Equations 7 and 8.

$$\mu_{post} = \frac{\frac{1}{\sigma_{prior}^2}\mu_{prior} + \frac{n}{\sigma^2}\underline{x}}{\frac{1}{\sigma_{prior}^2} + \frac{n}{\sigma^2}} \quad \text{(Equation 7)}$$

$$\sigma_{post}^2 = \frac{1}{\frac{1}{\sigma_{prior}^2} + \frac{n}{\sigma^2}} \quad \text{(Equation 8)}$$

In the above Equations 7 and 8, n represents a number of current advertisement campaigns involved in the calculation and $\underline{x}$ represents the average log OR value of the current advertisement campaign that is to be combined with the historical (prior) average log OR value.

Figure 5:
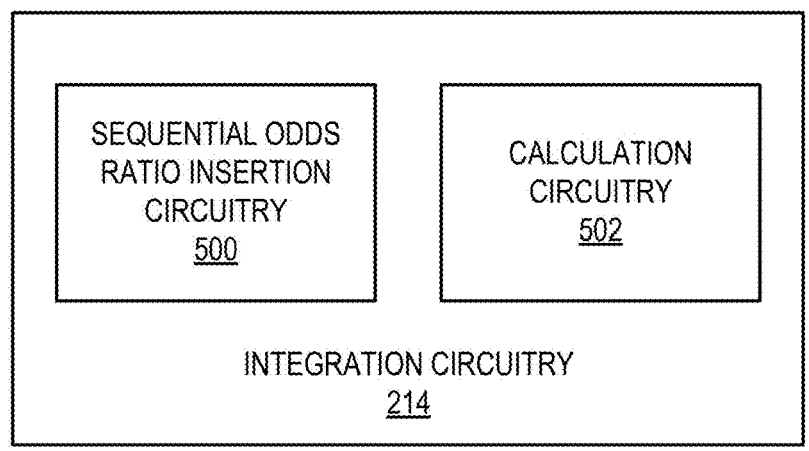
FIG. 5 is a block diagram of example integration circuitry of FIG. 2.

FIG. 5 is a block diagram of an example implementation of the integration circuitry 214 of FIG. 2. The example integration circuitry 214 includes example sequential odds ratio insertion (SOI) circuitry 500 and example calculation circuitry 502. The example calculation circuitry 502 may include hardware and/or software to perform multiplication and/or division operations.

The example SOI circuitry 500 of FIG. 5 outputs audience estimate distributions that align with the target odds ratios. The example SOI circuitry 500 obtains the target odds ratios from the example integration circuitry 214 and/or the priors processing circuitry 210. If the campaign is based on three platforms (A, B, C), the example SOI circuitry 500 chooses a starting point (e.g., 1) for all 3-way platform combinations. The example SOI circuitry 500 updates the starting point to align with the odds ratio of the two-way platform combinations (A and B). The resulting US estimates will have conditional odds ratios that match the odds ratios of the 2-way platform targets. In an example with three platforms (A, B, C), the example SOI circuitry 500 chooses a starting point of "1" for each audience bucket (however any number can be a starting point). The example SOI circuitry 500 updates the starting points to align with the odds ratios for each two-way platform combination (A and B) by updating the nn components (e.g., not exposed to the first or second platform of each of the two platform combinations), or any other combination of components (e.g., ny, yn, yy). Then, the example SOI circuitry 500 uses the calculation circuitry 502 to update the nnn (e.g., not exposed to any of the A, B, or C platforms) and nny (e.g., only exposed to the C platform) components such that the conditional odds ratios match the target odds ratio of AB ($OR_{AB}$) output by the example priors processing circuitry 210 of FIGS. 2 and/or 4. The example calculation circuitry 502 determines the odds ratio for platform A and B, conditional on C being n (e.g., no exposure via platform C) based on (yyn/ynn)/(nyn/nnn) =$OR_{AB}$. The example calculation circuitry 502 determines the odds ratio for platform A and B, conditional on C being y (e.g., exposure via platform C) based on (yyn/yny)/(nyn/nny)=$OR_{AB}$. After the nnn, nny components are updated to match the target odds ratio of AB, the example SOI circuitry 500 uses the example calculation circuitry 502 to update the nnn (e.g., not exposed to any of the A, B, or C platforms) and nyn (e.g., only exposed to the B platform) components such that the conditional odds ratios match the target odds ratio of AC ($OR_{AC}$) output by the example priors processing circuitry 2140 of FIGS. 2 and/or 4. The example calculation circuitry 502 determines the odds ratio for platform A and C, conditional on B being n (e.g., no exposure via platform B) based on (yny/ynn)/(nny/nnn)=$OR_{AC}$. The example calculation circuitry 502 determines the odds ratio for platform A and C, conditional on B being y (e.g., exposure via platform B) based on (yyy/yyn)/(nyy/nyn)=$OR_{AC}$. After the nnn, nny components are updated to match the target odds ratio of AC, the example SOI circuitry 500 uses the calculation circuitry 502 to update the nnn (e.g., not exposed to any of the A, B, or C platforms) and ynn (e.g., only exposed to the A platform) components such that the conditional odds ratios match the target odds ratio of AB ($OR_{AB}$) output by the example priors processing circuitry 210 of FIGS. 2 and/or 4. The example calculation circuitry 502 determines the odds ratio for platform B and C, conditional on A being n (e.g., no exposure via platform A) based on (nyy/nyn)/(nny/nnn)=$OR_{BC}$. The example calculation circuitry 502 determines the odds ratio for platform B and C, conditional on A being y (e.g., exposure via platform A) based on (yyy/yyn)/(yny/ynn)=$OR_{BC}$. An example of audience estimate distributions that align with the target odds ratios for a three-platform is illustrated below in Table 1. In Table 1 below, the target odds ratios for the two-platform combinations (e.g., output by the priors processing circuitry 210) is $OR_{AB}$=1.3, $OR_{AC}$=3.5 and $OR_{BC}$=3.

TABLE 1 audience estimate distribution example

| Platform exposure combo | nnn | nny | nyn | nyy | ynn | yny | yyn | yyy |
|---|---|---|---|---|---|---|---|---|
| Starting point | 1.00 | 1.00 | 1.00 | 1.00 | 1.00 | 1.00 | 1.00 | 1.00 |
| Step 1 | 1.30 | 1.30 | 1.00 | 1.00 | 1.00 | 1.00 | 1.00 | 1.00 |
| Step 2 | 4.55 | 1.30 | 3.50 | 1.00 | 1.00 | 1.00 | 1.00 | 1.00 |
| Step 3 | 13.65 | 1.30 | 3.50 | 1.00 | 3.00 | 1.00 | 1.00 | 1.00 |

Although the above example is described in conjunction with three platforms, the SOI circuitry 500 may determine audience estimate distribution based on any number of platforms.

In some examples, instead of determining a posterior odds ratio, as described above, the example SOI circuitry 500 determines a posterior deduplication count. For example, the example SOI circuitry 500 may use the example calculation circuitry 502 to determine the posterior deduplication count using Dirichlet distributions, each distribution defined with an Alpha parameter, which are brought together using the below Equation 9.

$$\text{Dirichlet\_prior}(a1, \ldots, an) * \text{Dirichlet\_panel}(b1, \ldots, bn) \cong \\ \text{Dirichlet\_posterior}((ai-1)+(bi-1), \ldots, (an-1)+(bn-1)) \quad \text{(Equation 9)}$$

Equation 9 provides a close estimation of the posterior deduplication count.

Although the example circuitry 114, 208, 210, 214 of FIGS. 2-5 include particular components. One or more of the components described in conjunction with the circuitry 114, 208, 210, 214 may be combined, separated, and/or located in different circuitry without or outside of the AME circuitry 114. For example, the combination circuitry 406 of the example priors processing circuitry 210 may instead be located in the example integration circuitry 214.

Figure 6:
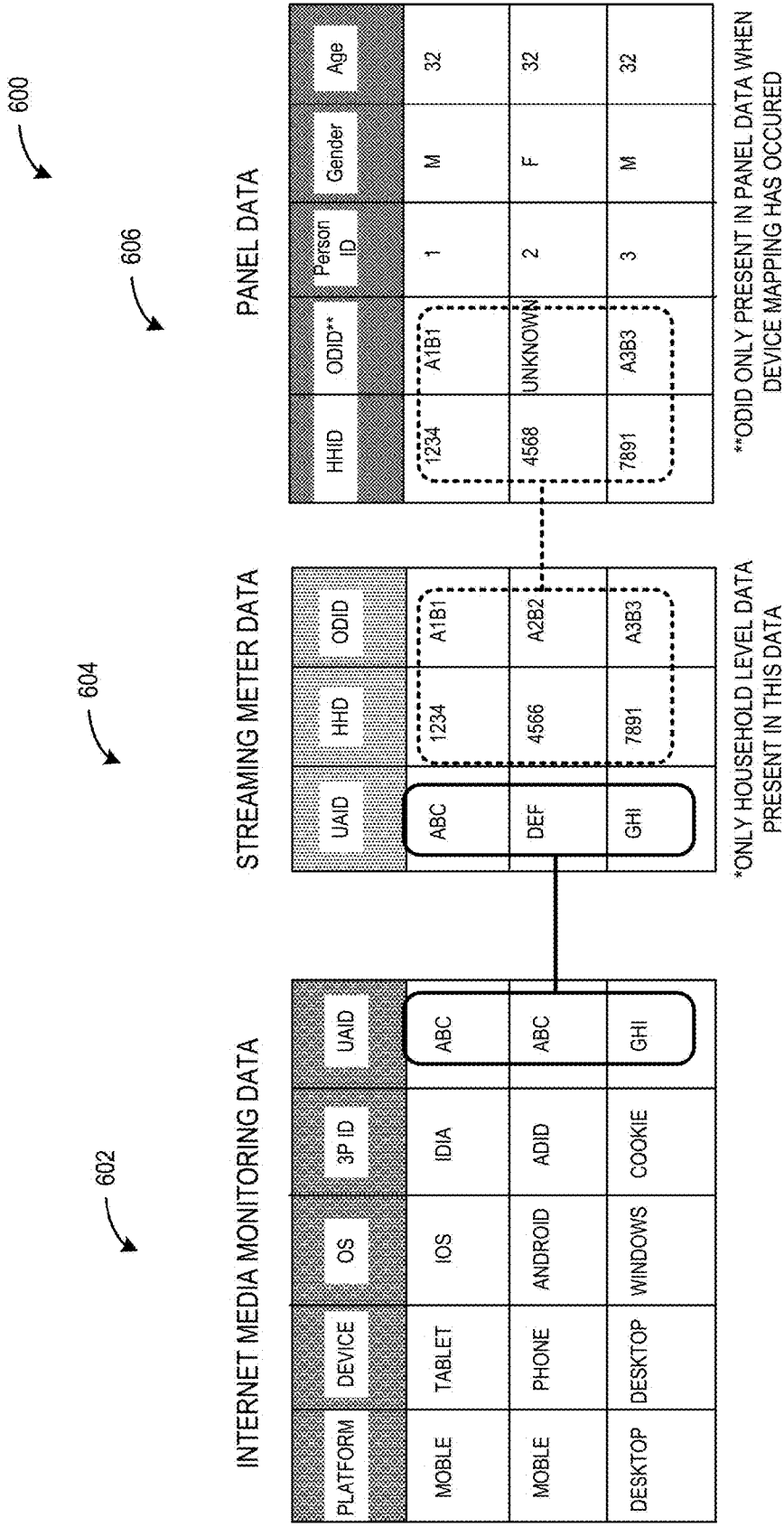
FIG. 6 illustrates example impression data, household data, and panel data.

FIG. 6 illustrates an example problem of obtaining household data and DAR data but not knowing which device and/or panel member of a household is responsible for a Internet media monitoring data. Example data 600 of FIG. 6 include example Internet media monitoring data 602, example streaming meter data 604, and example panel data 606.

The example Internet media monitoring data 602 of FIG. 6 includes daily DAR impressions collected by the example AME 112 of FIG. 1. The Internet media monitoring data 602 includes impressions from members of a household that identifies a platform, device, operating system, a third party (3P) identifier, and a UAID. The example streaming meter data 604 includes a household identifier (HHIS) and an operating device identifier (ODID) because only household level data is present for the streaming meter data 604. The ODID is only present for the panel data 606 when device mapping has occurred, as further described below in conjunction with FIG. 7.

Figure 7:
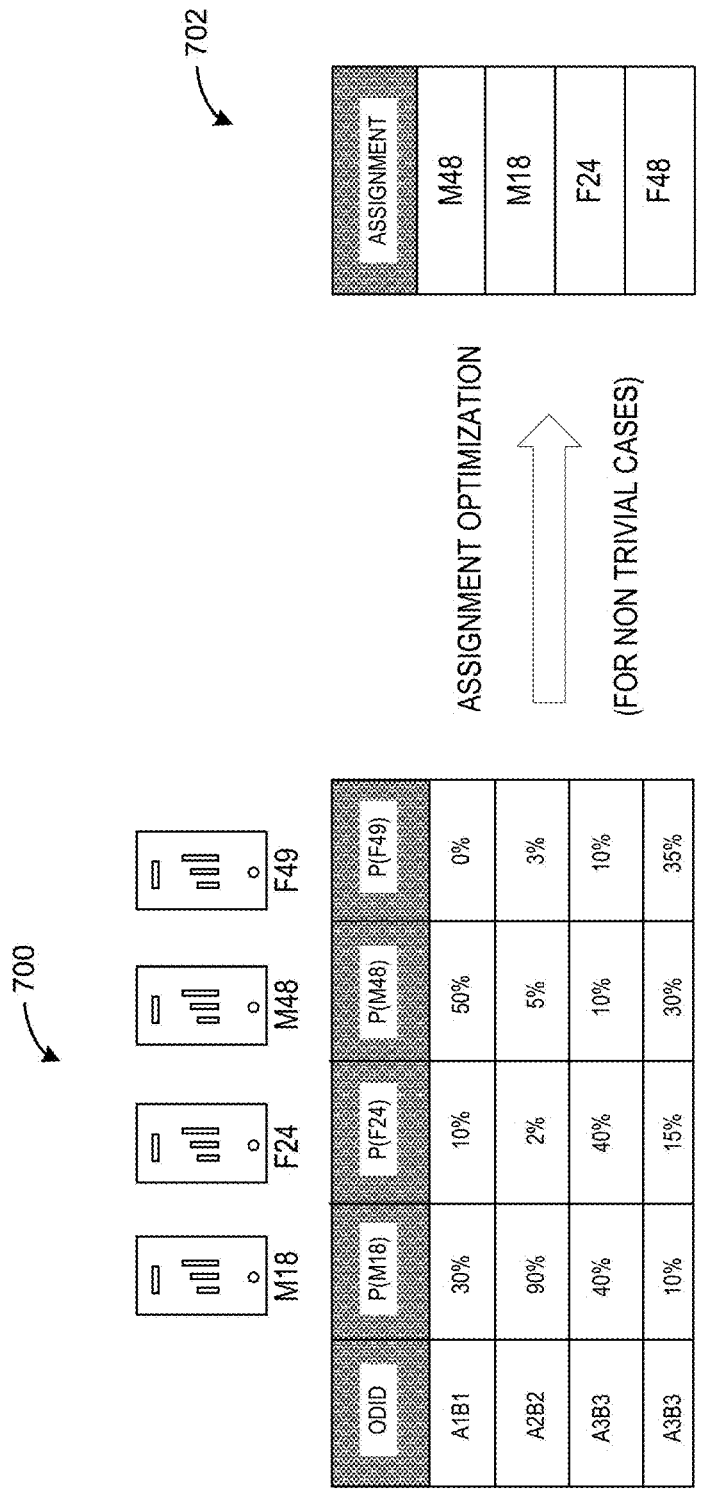
FIG. 7 illustrates an example process of mapping panelists of a household to a device.

FIG. 7 illustrates an example of device mapping modeling performed by the example panel processing circuitry 208 of FIGS. 2 and/or 3 to overcome the problem described above in conjunction with FIG. 6 of ODID's only being available for the panel data 606. FIG. 7 includes example device probabilities 700 and a corresponding example device mapping 702.

As described above, the example panel processing circuitry 208 assigns probabilities for each potential panelist device in a household using a model. In some examples, the model is an AI-based model that was trained using training data that links mapped devices to deterministic assignments/mappings. In some examples, previous assignments may be used to train the model as previous assignments are strong predictors, and strong predictors reduce assignment churn. The panel processing circuitry 208 may update the model periodically based on additional training data and/or feedback. In the example of FIG. 7, the panel processing circuitry 208 utilizes the model to output the example probabilities 700 that the streaming media corresponded to a particular panelist of the household. In the example of FIG. 7, P(X) corresponds to the probability that the media corresponded to panelist X, M18 corresponds to an 18-year old male in the household, F24 corresponds to a 24-year old female in the household, M48 corresponds to a 48-year old male in the household and F49 corresponds to a 49-year old female in the household. The example panel processing circuitry 208 assigns the ODID to the respective panelists in the household based on the output probabilities. For example, there was a 50% chance that the device corresponding to A181 is used by the M48 panelist. Thus, the example panel processing circuitry 208 assigned and/or mapped the A181 device to the M48 panelist.

FIG. 8 illustrates an example of alignment data performed by the example alignment circuitry 216 of FIG. 2. FIG. 8 includes example input data 800 and example maximum entropy output data 802.

The example alignment circuitry 216 of FIG. 2 obtains the input data 800 from the integration circuitry 214. The input data 800 includes platform marginals that include a campaign identifier, a platform identifier, a publisher identifier, and reaches for the corresponding platforms. The example input data 800 further includes campaign metadata and corresponding integration model output data. The campaign metadata includes a campaign identifier, network identifiers, and desktop site identifiers. The corresponding integration model output data includes data related to the priors to television only, desktop only, and television and desktop. In some examples, the input data 800 may include additional information based on additional platforms, campaigns, networks etc. that may be output by any of the circuitry 208, 210, 212, 214 of FIG. 2. As described above, the example alignment circuitry 216 uses constrained optimization using the input data. For example, the alignment circuitry 216 estimates row-by-row unique audience totals using marginals as constraints and integration model outputs as priors. Then, the alignment circuitry 216 can process the maximum entropy output data 802 to ensure logical consistency across levels of aggregation using logical constraints, as further described below.

The maximum entropy output data 802 of FIG. 8 is the result of the example alignment circuitry 216 using the input data 800 and the above-Equation 1. The example output data 802 includes unique audience totals for media (or probabilities of a member being exposed to the media) for the two platform, two network input data 800. The unique audience totals correspond to the network 1 and network 2, network 1 only, and network 2 only for television only, desktop only, or television and desktop. As described above, the maximum entropy output data 802 may include illogical UA totals at different aggregation levels (e.g., the unique audience for television and network for both networks being less than the maximum of the unique audience totals for network 1 and network 2. Accordingly, the example alignment circuitry 216 may perform a linear optimization to minimize the distance from the original maximum entropy estimates 802 but subject to the reporting logic constraints that uphold the marginal consistencies.

While an example manner of implementing the audience measurement entity circuitry 114 is illustrated in FIGS. 2-5, one or more of the elements, processes and/or devices illustrated in FIGS. 2-5 may be combined, divided, re-arranged, omitted, eliminated and/or implemented in any other way. Further, the example server 113, the example interface circuitry 200, the example panel database 202, the example priors database 204, the example census database 206, the example panel processing circuitry 208, the example priors processing circuitry 210, the example census processing circuitry 212, the example integration circuitry 214, the example alignment circuitry 216, the example reporting circuitry 218, the example sample generation circuitry 300, the example weighting circuitry 302, the example demographic adjustment circuitry 304, the example deduplication determination circuitry 306, the example odds ratio estimation circuitry 400, the example prior distribution determination circuitry 402, the example likelihood distribution determination circuitry 404, the example combination circuitry 406, the example sequential odds ratio insertion circuitry 500, the example calculation circuitry 502, and/or, more generally, the example audience measurement entity circuitry 114 of FIG. 2 may be implemented by hardware alone or by hardware in combination with software and/or firmware. Thus, for example, any of the example server 113, the example interface circuitry 200, the example panel database 202, the example priors database 204, the example census database 206, the example panel processing circuitry 208, the example priors processing circuitry 210, the example census processing circuitry 212, the example integration circuitry 214, the example alignment circuitry 216, the example reporting circuitry 218, the example sample generation circuitry 300, the example weighting circuitry 302, the example demographic adjustment circuitry 304, the example deduplication determination circuitry 306, the example odds ratio estimation circuitry 400, the example prior distribution determination circuitry 402, the example likelihood distribution determination circuitry 404, the example combination circuitry 406, the example sequential odds ratio insertion circuitry 500, the example calculation circuitry 502, and/or, more generally, the example audience measurement entity circuitry 114 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). Further still, the example server 113, and/or the example audience measurement entity circuitry 114 of FIGS. 2-5 may include one or more elements, processes and/or devices in addition to, or instead of, those illustrated in FIGS. 2-5, and/or may include more than one of any or all of the illustrated elements, processes, and devices.

Flowcharts representative of example hardware logic, machine readable instructions, hardware implemented state machines, and/or any combination thereof for implementing the server 113 and/or the audience measurement entity circuitry 114 of FIGS. 2-5 are shown in FIG. 9-13. The machine readable instructions may be one or more executable programs or portion(s) of an executable program for execution by a computer processor and/or processor circuitry, such as the processor 1412 shown in the example processor platform 1400 discussed below in connection with FIG. 14. The program(s) may be embodied in software stored on a non-transitory computer readable storage medium such as a CD-ROM, a floppy disk, a hard drive, a solid-state driver (SSD), a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 9-13, many other methods of implementing the example audience measurement entity circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 9:
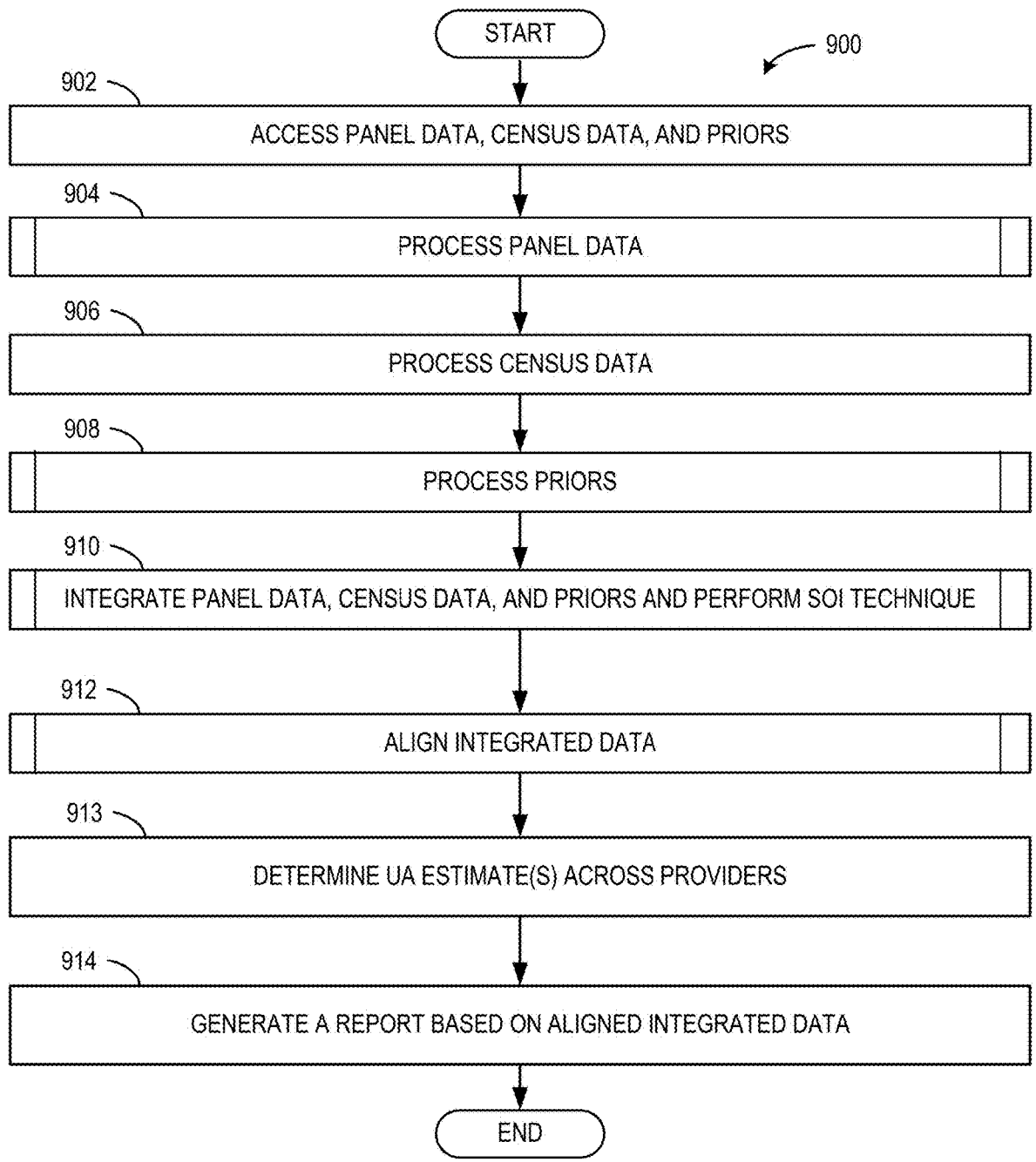
FIG. 9 is a flowchart representative of example machine readable instructions and/or example operations that may be executed by example processor circuitry to implement the example audience measurement entity circuitry of FIG. 2 to generate logically consistent unique audience estimates across different platform combinations.

FIG. 9 illustrates an example flowchart representative of example machine readable instructions 900 that may be executed by processor circuitry (e.g., the processor 1400 of FIG. 14) to implement the example audience measurement entity circuitry 114 of FIG. 2 to generate a report corresponding to media accesses across different demographics, platforms, networks, etc. Although the flowchart of FIG. 9 is described in conjunction with unique audience totals and the example audience measurement entity circuitry 114 of FIG. 2, the instructions may be executed by any computer device with any type of data (e.g., probability distributions, impressions totals, store visits, media exposure, etc.).

At block 902, the example panel processing circuitry 208 (FIG. 1) accesses, obtains, and/or receives panel data (e.g., unique audience totals and impression request(s)) from the example panel database 202 (FIG. 2), the example prior processing circuitry 210 (FIG. 1) accesses, obtains, and/or receives prior data from the priors database 204 (FIG. 2), and the census processing circuitry 212 (FIG. 2) accesses, obtains, and/or receives census data from the example census database 206 (FIG. 2). The panel data, prior data, and/or census data may be based on impressions and/or metering data obtained via one or more wireless communications. In some examples, the data stored in the databases 202, 204, 206 may be aggregated and/or preprocessed by the example AME 112 to determine unique audience totals and/or impression totals for an advertisement campaign or other monitored media. The data stored in the databases 202, 204, 206 may be based on data from the database proprietor 110 and/or the example client device 102 (FIG. 1) via network communications (e.g., corresponding to the network 104 of FIG. 1). In some examples, the server 113 obtains information corresponding to the impression request(s) 106 from the example database proprietor 110 (FIG. 1), as further described above in conjunction with FIG. 1. As described above, the impression requests 106 include information related to an access of media (e.g., an advertisement, a show, a podcast, a video, audio, an image, etc.) by one or more of the client devices 102.

At block 904, the example panel processing circuitry 208 (FIG. 2) processes panel data, as further described below in conjunction with FIG. 10. At block 906, the example census processing circuitry 906 (FIG. 2) processes the census data. For example, the panel processing circuitry 208 can leverage device identifiers captured by the AME 112 to match person-level device clusters within an AME-based identifier system and utilize datasets and algorithm to identify audience duplication at a person level within live campaigns based on the census data. In some examples, the census processing circuitry 212 generates a persons/household graph based on the census impressions data and census PII data to determine an observed overlap the impression data ant eh census PII data. In some examples, the census processing circuitry 212 can combine the observed deduplication error and overlap to generate a unification of sample, weight the sample, and forward propagation errors to generate a corrected census deduplication audience.

At block 908, the example priors processing circuitry 210 (FIG. 2) processes the priors, as further described below in conjunction with FIG. 11. At block 910, the example integration circuitry 214 (FIG. 2) integrates the processed panel data, census data, and priors and perform a SOI technique, as further described below in conjunction with FIG. 12. At block 912, the example alignment circuitry 216 (FIG. 2) aligns the integrated data output by the integration circuitry 214, as further described below in conjunction with FIG. 13. At block 913, the example alignment circuitry 216 determines UA estimates (e.g., unique audience total(s)) across different providers (e.g., determine cross provider platform estimates). For example, the alignment circuitry 216 may use an independent deduplication, odds ratio, or Frechet Ratio Technique, as further described above in conjunction with FIG. 2. At block 914, the example reporting circuitry 218 (FIG. 2) generates a report based on the aligned integrated data. For example, the reporting circuitry 218 may include unique audience totals and/or a probability distribution of exposure to a media campaign across different demographics, platform combinations, providers, networks, etc. that is logistically consistent for the different margins of the media campaign. The report may be displayed to a user, stored in memory, and/or transmitted to another device via one or more network communications.

Figure 10:
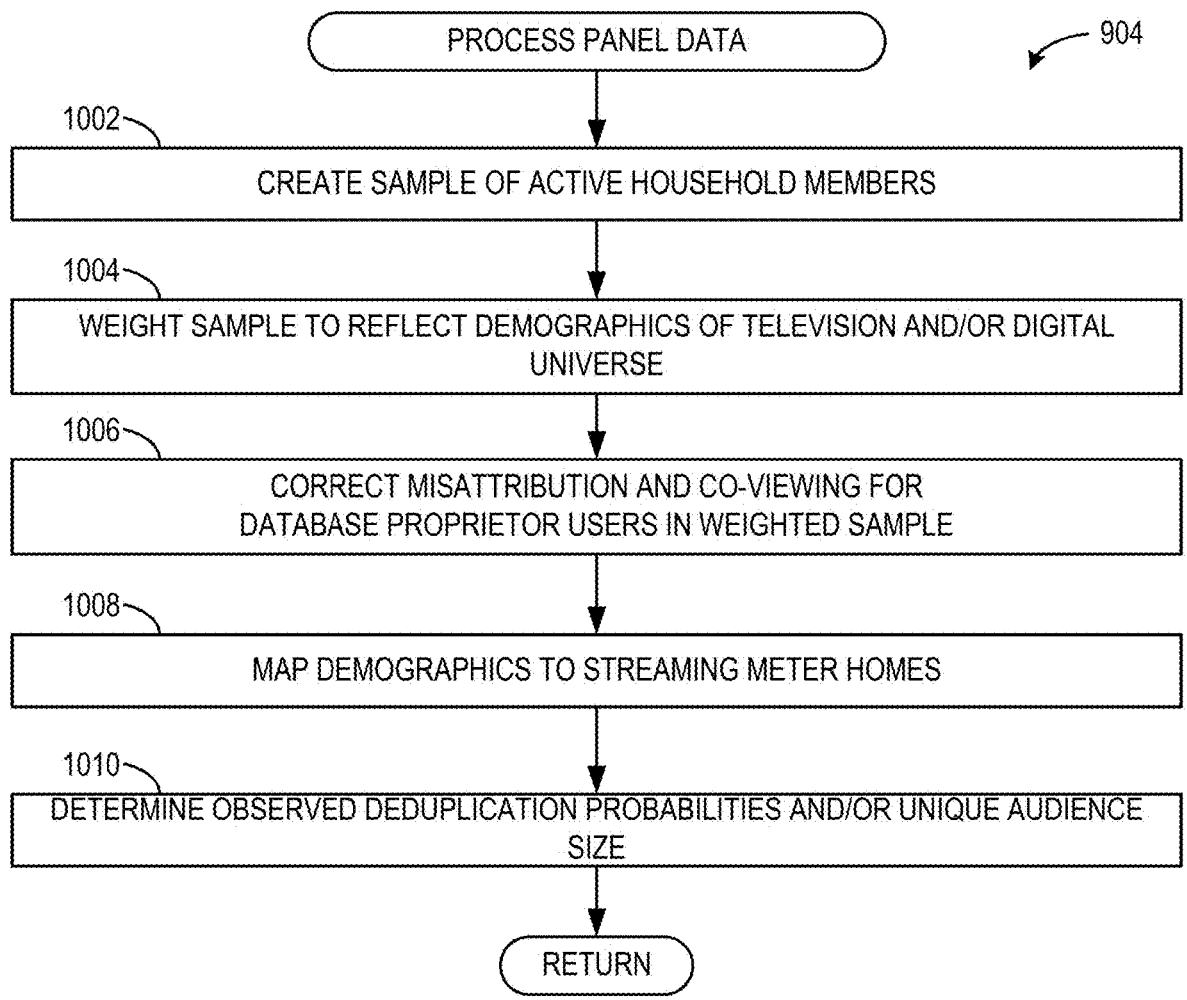
FIG. 10 is a flowchart representative of example machine readable instructions and/or example operations that may be executed by example processor circuitry to implement the example audience measurement entity circuitry of FIG. 2 to process panel data.

FIG. 10 illustrates an example flowchart representative of example machine readable instructions 904 that may be executed by processor circuitry (e.g., the processor 1400 of FIG. 14) to implement the example panel processing circuitry 208 of FIG. 3 to process panel data. The example instructions of FIG. 10 may be used to implement block 904 of FIG. 9. At block 1002, the example sample generation circuitry 300 (FIG. 3) creates a sample of active household members. For example, the sample generation circuitry 300 may generate the sample based on PII matches of panel members to demographic impressions from the database prorector 110 of FIG. 1 or based on UAID matches of homes of panel members to Internet media monitoring data collected via a streaming meter.

At block 1004, the example weighting circuitry 302 (FIG. 3) weights the sample to reflect the demographics of the television and/or digital universe. At block 1006, the example demographic adjustment circuitry 304 corrects misattribution and/or co-viewing of database proprietor users in the weighted sample. As described above, the demographic adjustment circuitry 304 leverages TV metering data as truth data to adjust CTV demographics to account for misattribution and/or co-viewing. At block 1008, the example demographic adjustment circuitry 304 (FIG. 3) maps demographics to the streaming meter homes. For example, the demographic adjustment circuitry 304 maps demographics of panelists in a household to a particular device, as further described above in conjunction with FIGS. 3, 6 and 7. At block 1010, the example deduplication determination circuitry 306 (FIG. 3) determines the observed deduplication probabilities and/or unique audience size based on the panel data. For example, the deduplication determination circuitry 306 determines all possible campaign platform overlaps within a panel. After block 1010, control returns to block 906 of FIG. 9.

Figure 11:
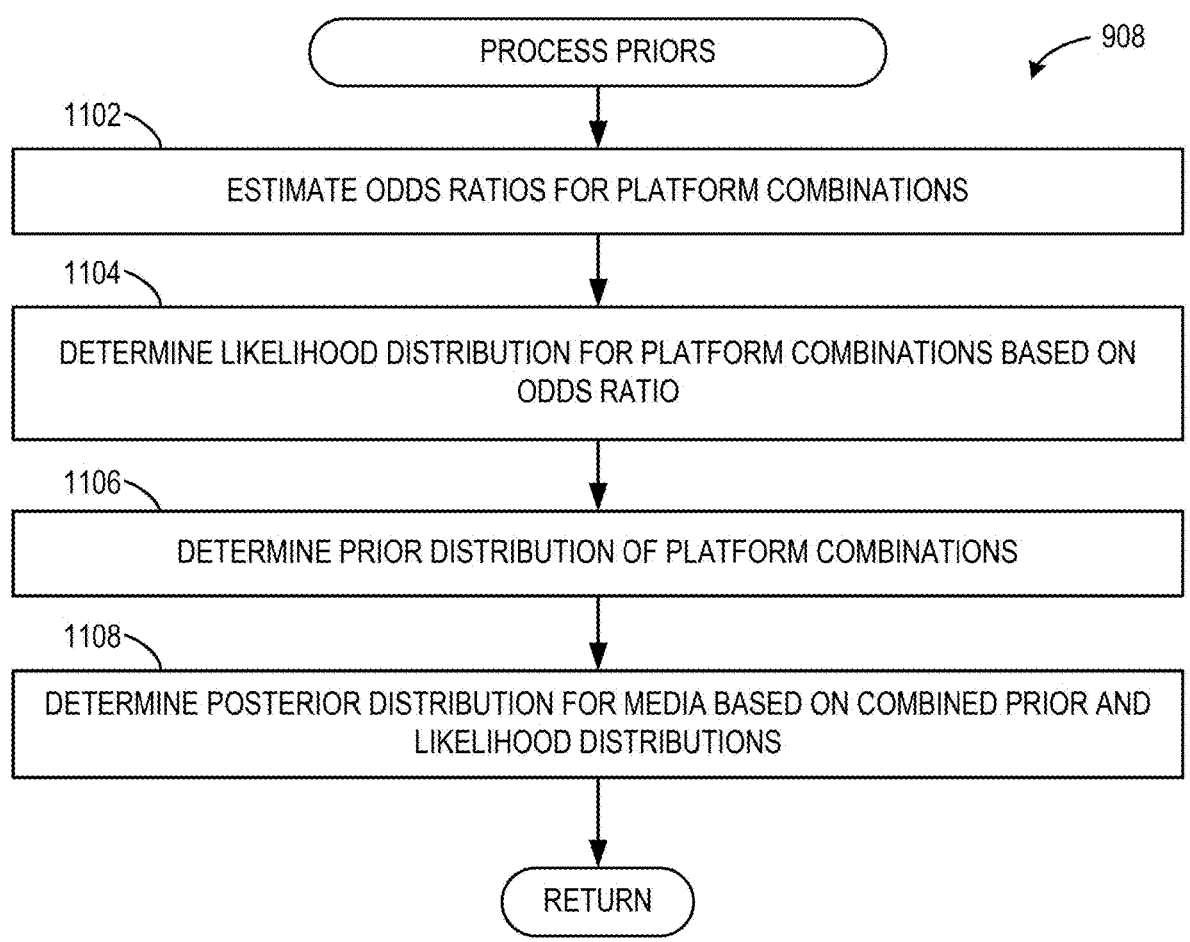
FIG. 11 is a flowchart representative of example machine readable instructions and/or example operations that may be executed by example processor circuitry to implement the example audience measurement entity circuitry of FIG. 2 to process priors.

FIG. 11 illustrates an example flowchart representative of example machine readable instructions 908 that may be executed by processor circuitry (e.g., the processor 1400 of FIG. 14) to implement the example priors processing circuitry 210 of FIG. 4 to process priors. The example instructions of FIG. 11 may be used to implement block 908 of FIG. 9. At block 1102, the example odds ratio estimation circuitry 400 (FIG. 4) estimates odds ratios for the different two-way platform combinations. For example, the odds ratio estimation circuitry 400 may determine the odds ratio based on the above—Equation 2 for the different two-way platform combinations.

At block 1104, the example likelihood distribution determination circuitry 404 (FIG. 2) determines a likelihood of the platform combinations based on the odds ratios and/or the prior distribution. For example, the odds ratio estimation circuitry 400 may determine the mean and standard error using the above—Equation 5 and 6, as further described above in conjunction with FIG. 4. At block 1106, the example prior distribution determination circuitry 402 (FIG. 4) determines a prior distribution of the platform combinations based on the estimated odds ratios. For example, the prior distribution determination circuitry 402 may determine a mean and standard error for the prior distribution using the above Equations 3 and 4, as described above in conjunction with FIG. 4. The example prior distribution determination circuitry 402 may determine the prior distribution periodically. Accordingly, the prior distribution is calculated can be used for multiple campaigns until it scheduled to be recalculated. At block 1108, the example combination circuitry 406 (FIG. 4) determines the posterior distribution for the advertisement campaign or media based on the combined prior and likelihood distributions. For example, the combination circuitry 406 may use the prior and likelihood distributions to determine the posterior distribution using the above Equations 7 and 8. After block 1108, control returns to block 910 of FIG. 9.

Figure 12:
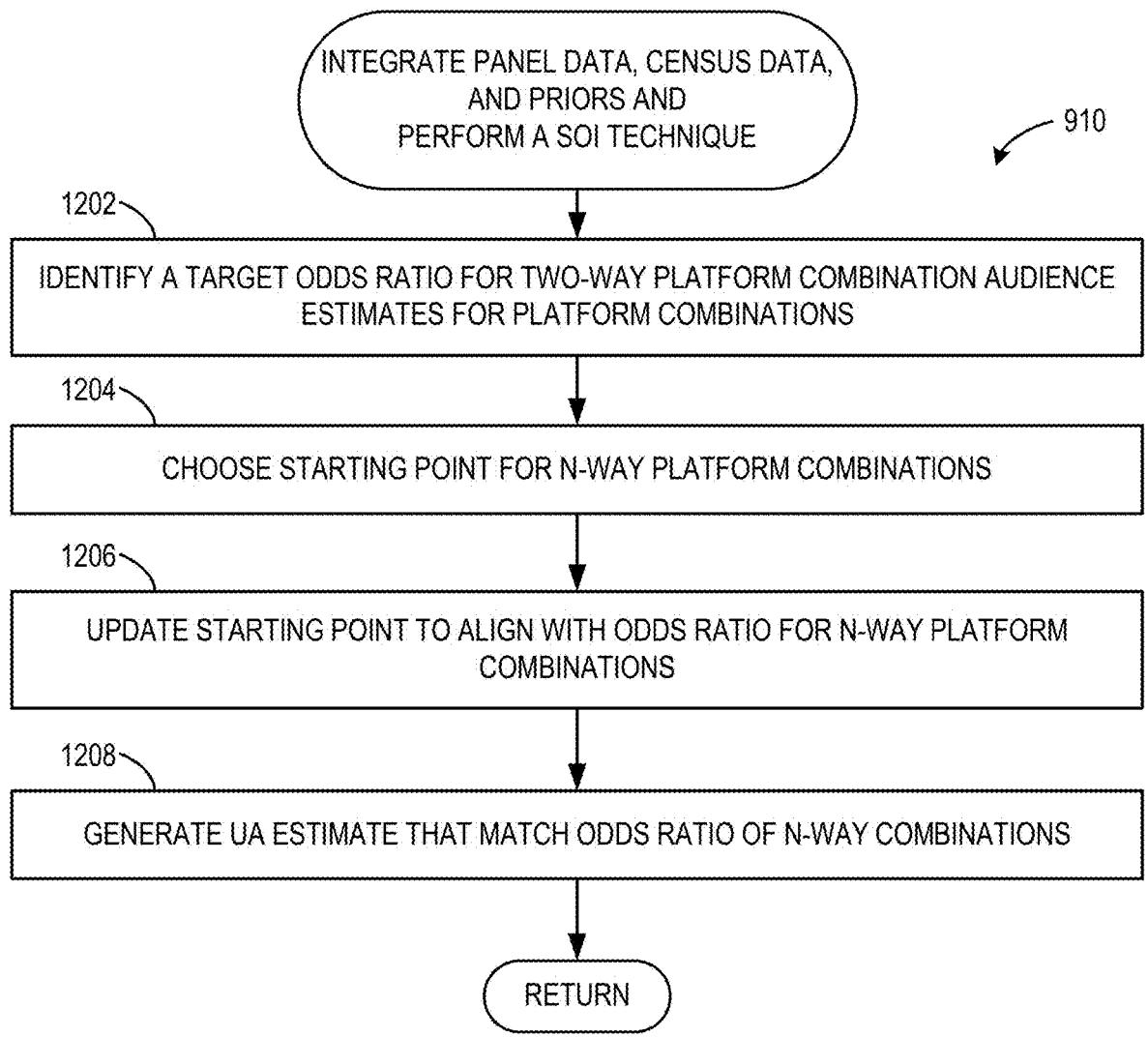
FIG. 12 is a flowchart representative of example machine readable instructions and/or example operations that may be executed by example processor circuitry to implement the example audience measurement entity circuitry of FIG. 2 to integrate panel data, census data, and priors by performing a sequential odds ratio insertion technique.

FIG. 12 illustrates an example flowchart representative of example machine readable instructions 908 that may be executed by processor circuitry (e.g., the processor 1400 of FIG. 14) to implement the example integration circuitry 214 of FIG. 5 to integrate panel data, census data, and/or priors and perform a SOI technique. The example instructions of FIG. 12 may be used to implement 910 of FIG. 9. At block 1202, the example sequential odds ratio insertion circuitry 500 (FIG. 5) identifies a target odds ratio for the two-way platform combination audience estimates for the platform combinations. For example, the sequential odds ratio insertion circuitry 500 uses the obtained posterior odds ratios for the platform combination pairs as the target odds ratios for the two-way platform combination audience estimates.

At block 1204, the example SOI circuitry 500 chooses a starting point for the N-way platform combinations. For example, the SOI circuitry 500 may choose a starting point of '1' for all N-way platform combinations. Alternatively, the SOI circuitry 500 may choose any number(s) for the N-way platform combinations (e.g., any value that provides an accurate representation for the n-way count vector prior to being calibrated by the odds ratios and SOI). For example, the SOI circuitry may implement a model (e.g., an AI-based model) to predict an n way vector base on historical data (e.g., priors data) and combine the historical data with a vector observed for the current media/advertising campaign through the panel. At block 1206, the example SOI circuitry 500 updates the starting point(s) to align with the odds ratios for the N-way platform combinations. For example, the example SOI circuitry 500 updates the starting points to align with the odds ratios for each two-way platform combination (A and B) by updating the nn components (e.g., not exposed to the first or second platform of each of the two platform combinations), or any other combination of components (e.g., ny, yn, yy). At block 1208, the example calculation circuitry 502 (FIG. 5) generates a unique audience (UA) total estimate that matches the odds ratios of the N-way combinations. For example, the calculation circuitry 502 updates the chosen numbers for the N-way platform combination per platform, as described above in conjunction with FIG. 5.

Figure 13:
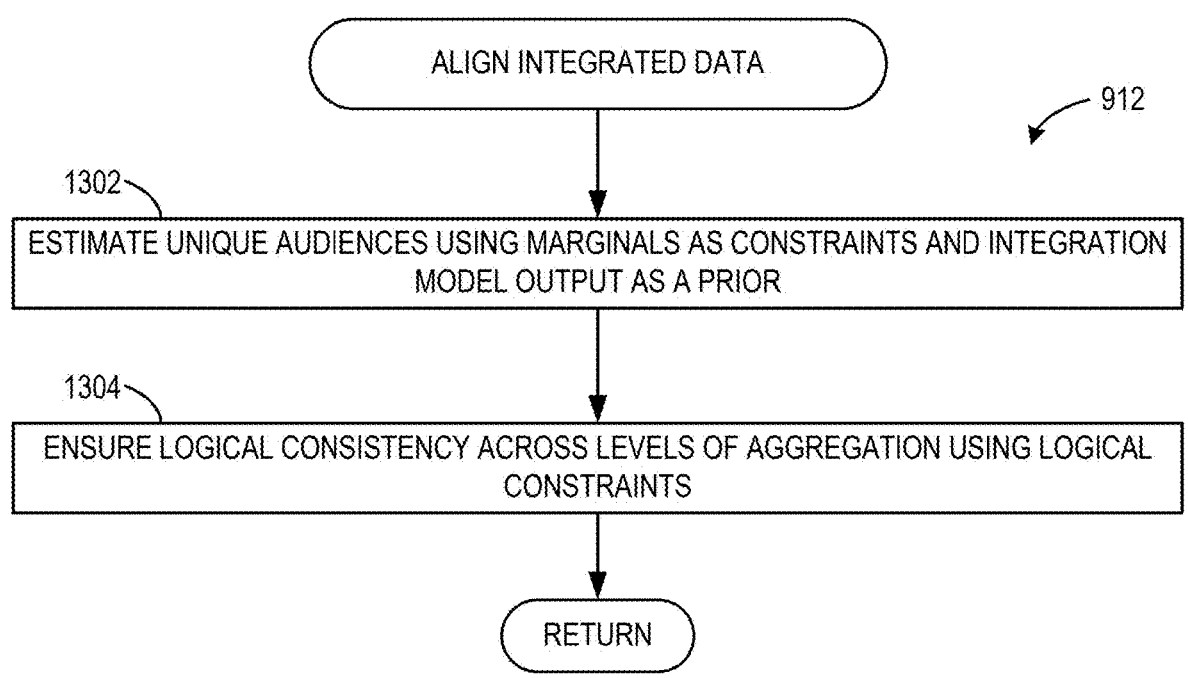
FIG. 13 is a flowchart representative of example machine readable instructions and/or example operations that may be executed by example processor circuitry to implement the example audience measurement entity circuitry of FIG. 2 to align integrated data.

FIG. 13 illustrates an example flowchart representative of example machine readable instructions 908 that may be executed by processor circuitry (e.g., the processor 1400 of FIG. 14) to implement the example alignment circuitry 216 of FIG. 2 to align the integrated data. The instructions of FIG. 13 may be used to implement block 912 of FIG. 9. At block 1302, the example alignment circuitry 216 estimates the unique audience total(s) using marginals as constraints and the integration model output as a prior. For example, the alignment circuitry 216 can use the above Equation 1. As described above in conjunction with FIG. 2, the alignment circuitry 216 estimates the unique audience using a maximum entropy technique to align the deduplication audience totals and/or probabilities across platforms, demographics, and/or publishers. At block 1304, the example alignment circuitry 216 ensures logical consistency across levels of aggregation using logical constraints. For example, the alignment circuitry 216 can perform a linear optimization to ensure logical consistency among the unique audience totals and/or probabilities, as described above in conjunction with FIG. 2.

Figure 14:
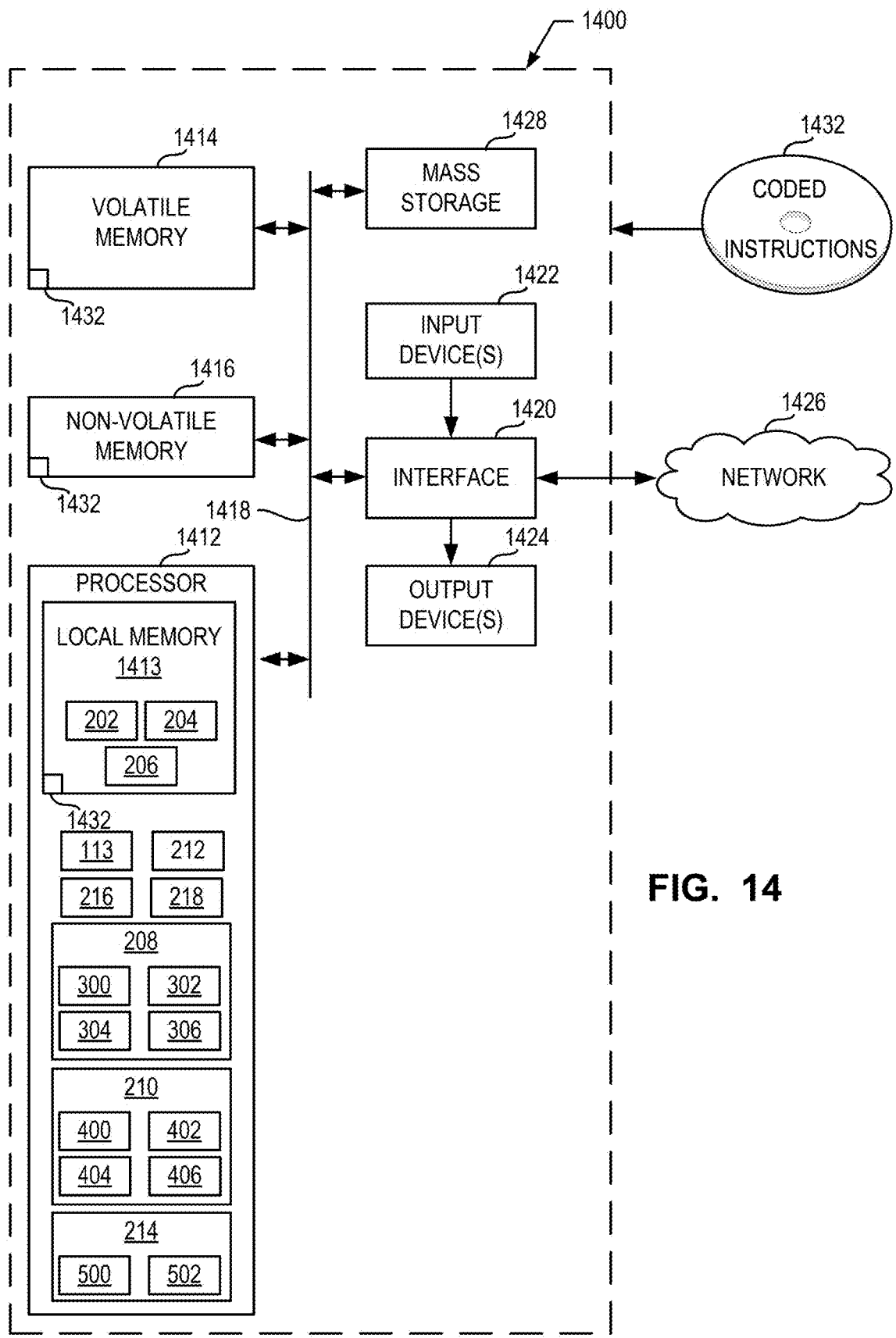
FIG. 14 is a block diagram of an example processing platform including processor circuitry structured to execute the example machine readable instructions and/or the example operations of FIGS. 9-13 to implement the example audience measurement entity circuitry of FIG. 2.

FIG. 14 is a block diagram of an example processor platform 1400 structured to execute the instructions of FIGS. 9-13 to implement the server 113 of FIG. 1 and/or the audience measurement entity circuitry 114 of FIG. 2. The processor platform 1400 can be, for example, a server, a personal computer, a workstation, a self-learning machine (e.g., a neural network, an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example server 113, the example panel processing circuitry 208, the example priors processing circuitry 210, the example census processing circuitry 212, the example integration circuitry 214, the example alignment circuitry 216, the example reporting circuitry 218, the example sample generation circuitry 300, the example weighting circuitry 302, the example demographic adjustment circuitry 304, the example deduplication determination circuitry 306, the example odds ratio estimation circuitry 400, the example prior distribution determination circuitry 402, the example likelihood distribution determination circuitry 404, the example combination circuitry 406, the example sequential odds ratio insertion circuitry 500, and the example calculation circuitry 502 of FIGS. 2-5.

The processor 1412 of the illustrated example includes a local memory 1413 (e.g., a cache). In the example of FIG. 14 the local memory 1413 implements the example panel database 202, the example priors database 204, and the example census database 206. However, the volatile memory 1414 and/or non-volatile memory 1416 may implement the example panel database 202, the example priors database 204, and/or the example census database 206. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

Example machine executable instructions 1432 represented in FIGS. 9-13 may be stored in the mass storage device 1428, in the volatile memory 1414, in the non-volatile memory 1416, and/or on a removable non-transitory computer readable storage medium such as a CD or DVD.

Figure 15:
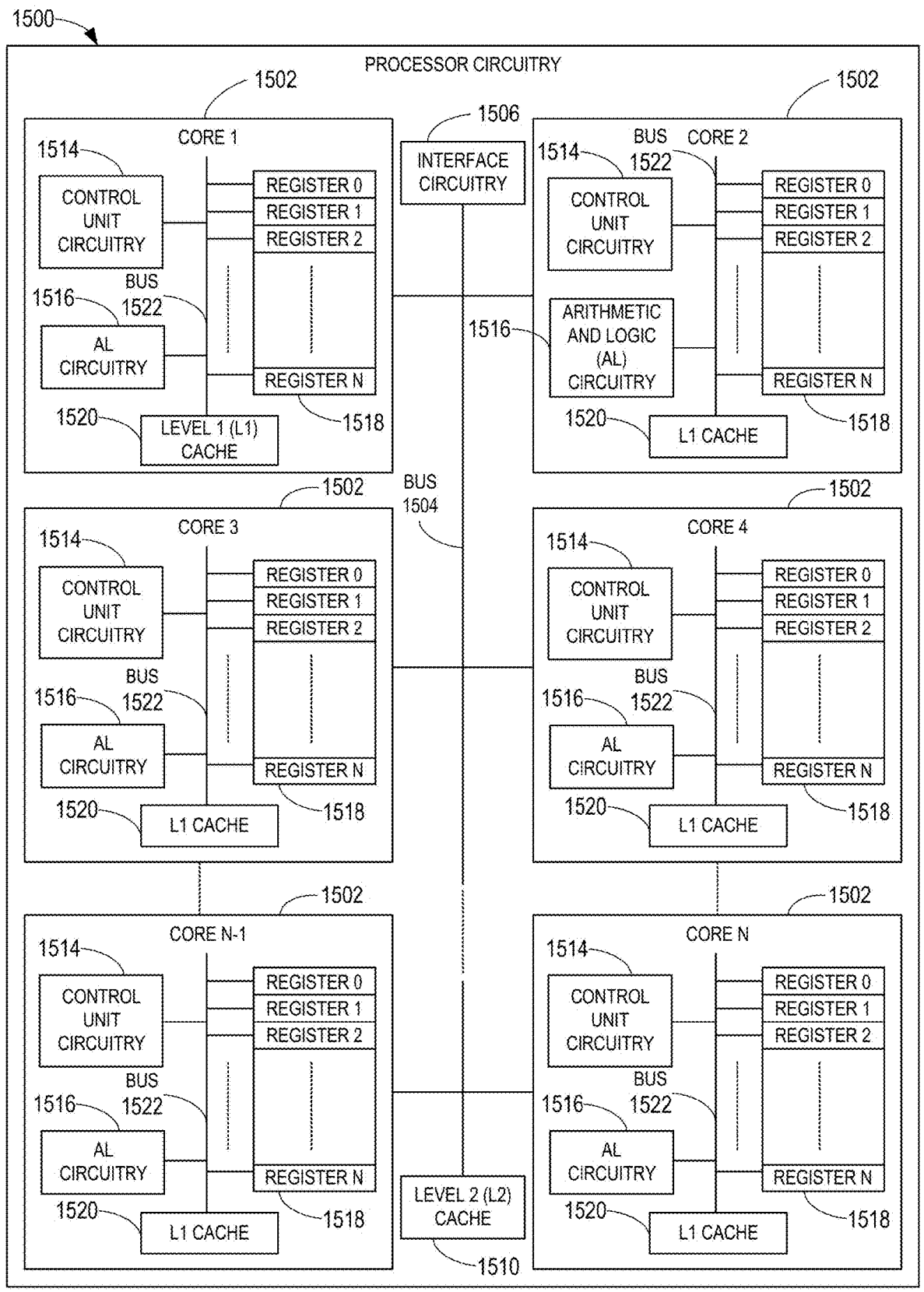
FIG. 15 is a block diagram of an example implementation of the processor circuitry of FIG. 14.

FIG. 15 is a block diagram of an example implementation of the processor circuitry 1412 of FIG. 14. In this example, the processor circuitry 1412 of FIG. 14 is implemented by a general purpose microprocessor 1500. The general purpose microprocessor circuitry 1500 executes some or all of the machine readable instructions of the flowcharts of FIGS. 9-13 to effectively instantiate the server 113 and/or audience measurement entity circuitry 114 of FIG. 2 as logic circuits to perform the operations corresponding to those machine readable instructions. In some such examples, the circuitry of FIG. 2 is instantiated by the hardware circuits of the microprocessor 1500 in combination with the instructions. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS. 9-13.

The cores 1502 may communicate by a first example bus 1504. In some examples, the first bus 1504 may implement a communication bus to effectuate communication associated with one(s) of the cores 1502. For example, the first bus 1504 may implement at least one of an Inter-Integrated Circuit (I2C) bus, a Serial Peripheral Interface (SPI) bus, a PCI bus, or a PCIe bus. Additionally or alternatively, the first bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2_cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
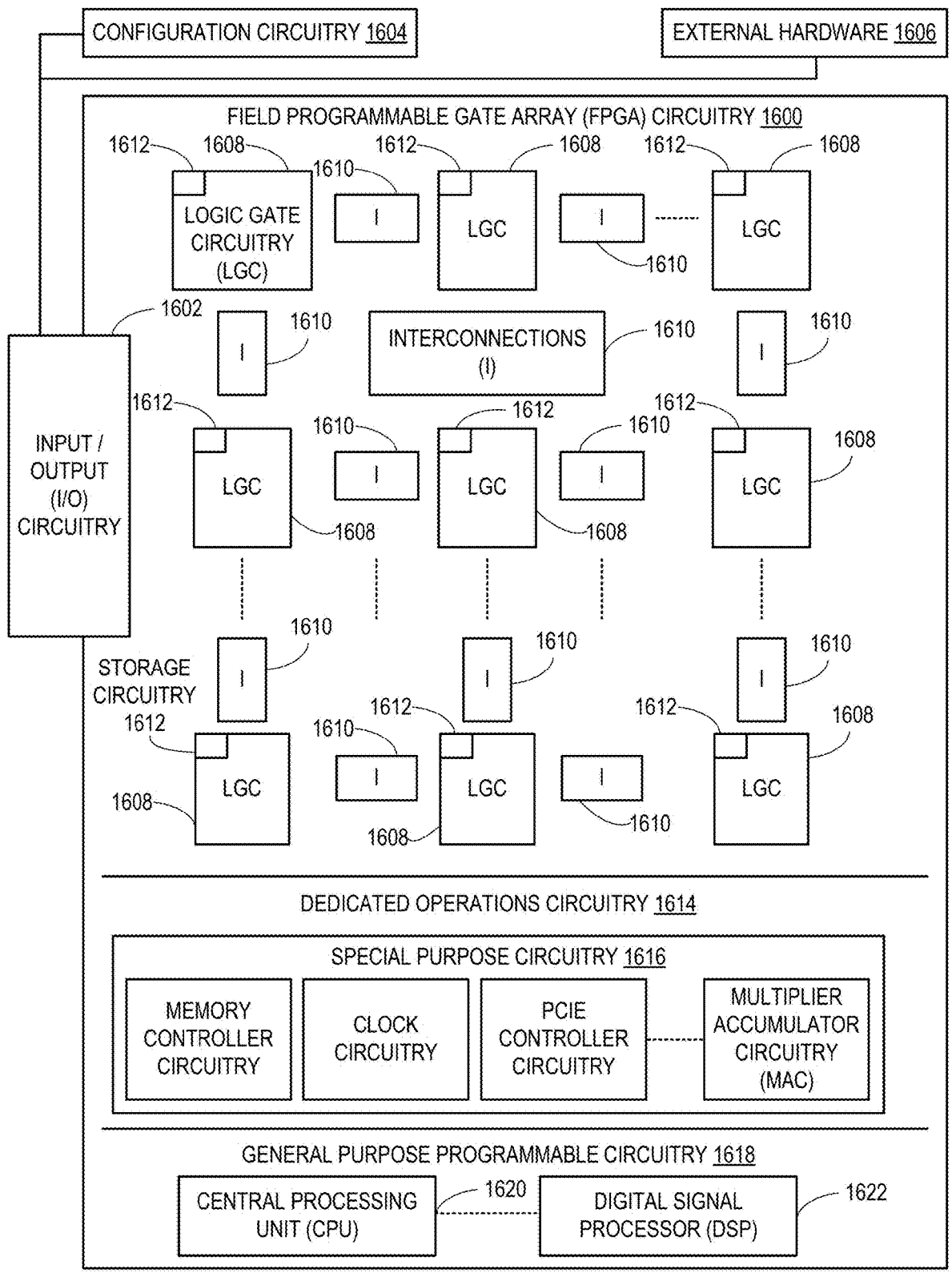
FIG. 16 is a block diagram of another example implementation of the processor circuitry of FIG. 14.

FIG. 16 is a block diagram of another example implementation of the processor circuitry 1412 of FIG. 14. In this example, the processor circuitry 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 9-13 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 9-13. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 9-13. As such, the FPGA circuitry 1600 may be structured to effectively instantiate some or all of the machine readable instructions of the flowcharts of FIGS. 9-13 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIGS. 9-13 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 9-13 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 9-13 may be executed by one or more of the cores 1502 of FIG. 15, a second portion of the machine readable instructions represented by the flowcharts of FIGS. 9-13 may be executed by the FPGA circuitry 1600 of FIG. 16, and/or a third portion of the machine readable instructions represented by the flowcharts of FIGS. 9-13 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1412 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1412 of FIG. 14, which may be in one or more packages. For example, the XPU may include a CPU in one package, a DSP in another package, a GPU in yet another package, and an FPGA in still yet another package.

Figure 17:
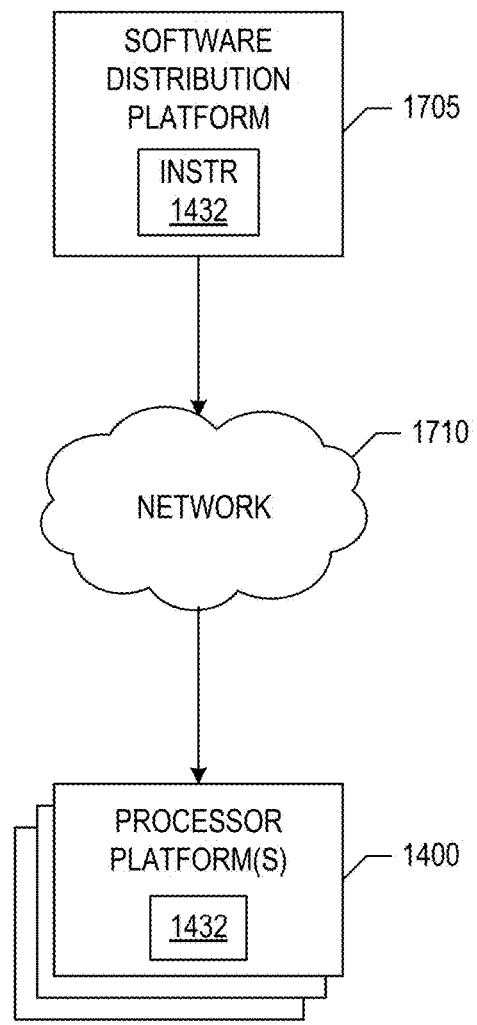
FIG. 17 is a block diagram of an example software distribution platform (e.g., one or more servers) to distribute software (e.g., software corresponding to the example machine readable instructions of FIGS. 9-13) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1432 of FIG. 14 to hardware devices owned and/or operated by third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1432 of FIG. 17. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1432, which may correspond to the example machine readable instructions of FIGS. 9-13 as described above. The one or more servers of the example software distribution platform 1705 are in communication with a network 1710, which may correspond to any one or more of the Internet and/or any of the network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1432 from the software distribution platform 1705. For example, the software, which may correspond to the example machine readable instructions of FIGS. 9-13 may be downloaded to the example processor platform 1400, which is to execute the machine readable instructions 1432 to implement the example audience measurement entity circuitry 114. In some example, one or more servers of the software distribution platform 1705 periodically offer, transmit, and/or force updates to the software (e.g., the example machine readable instructions 1432 of FIG. 14) to ensure improvements, patches, updates, etc., are distributed and applied to the software at the end user devices.

Example methods, apparatus, systems, and articles of manufacture to deduplicate audience estimates from multiple computer sources are disclosed herein. Further examples and combinations thereof include the following:

Example 1 includes a system comprising at least one memory, programmable circuitry, and instructions in the memory to cause the programmable circuitry to access media impression data via one or more wireless communications, the media impression data including panel data obtained from a meter and impression information obtained after an access of media at a computing device, determine an audience deduplication based on the panel data, determine odds ratios for platform combinations based on the audience deduplication, determine posterior distributions for the media based on the odds ratios, perform a sequential odds ratio insertion technique based on the posterior distributions to determine unique audience sizes, align the unique audience sizes based on a constraint, and generate a report including the aligned unique audience sizes.

Example 2 includes the system of example 1, wherein the programmable circuitry is to determine the observed deduplication across platforms.

Example 3 includes the system of example 2, wherein the platforms include at least one of television, connected television, addressable television, desktop, or mobile.

Example 4 includes the system of example 1, wherein the programmable circuitry is to determine a prior distribution based on historical information, determine a likelihood distribution based on the odds ratios, and combine the prior distribution and the likelihood distribution to determine the posterior distributions.

Example 5 includes the system of example 1, wherein the unique audience sizes are first unique audience sizes, the programmable circuitry to align the first unique audience sizes by estimating second unique audience sizes using (a) marginals as constraints and (b) the first unique audience sizes as a prior, and performing a linear optimization to ensure logical consistency across levels of aggregation.

Example 6 includes the system of example 1, wherein the programmable circuitry is to map household panelists to devices based on household metering data and the impression data by utilizing a probability distribution model.

Example 7 includes the system of example 1, wherein the media impression data includes census data, the programmable circuitry to generate census audience deduplication counts based on the census data, the unique audience sizes based on the census audience deduplication counts.

Example 8 includes a non-transitory computer readable medium comprising instructions which, when executed, cause one or more processors to at least access media impression data via one or more wireless communications, the media impression data including panel data obtained from a meter and impression information obtained after an access of media at a computing device, determine an audience deduplication based on the panel data, determine odds ratios for platform combinations based on the audience deduplication, determine posterior distributions for the media based on the odds ratios, perform a sequential odds ratio insertion technique based on the posterior distributions to determine unique audience sizes, align the unique audience sizes based on a constraint, and generate a report including the aligned unique audience sizes.

Example 9 includes the non-transitory computer readable medium of example 8, wherein the instructions cause the one or more processors to determine the observed deduplication across platforms.

Example 10 includes the non-transitory computer readable medium of example 9, wherein the platforms include at least one of television, connected television, addressable television, desktop, or mobile.

Example 11 includes the non-transitory computer readable medium of example 8, wherein the instructions cause the one or more processors to determine a prior distribution based on historical information, determine a likelihood distribution based on the odds ratios, and combine the prior distribution and the likelihood distribution to determine the posterior distributions.

Example 12 includes the non-transitory computer readable medium of example 8, wherein the unique audience sizes are first unique audience sizes, the instruction to cause the one or more processors to align the first unique audience sizes by estimating second unique audience sizes using (a) marginals as constraints and (b) the first unique audience sizes as a prior, and performing a linear optimization to ensure logical consistency across levels of aggregation.

Example 13 includes the non-transitory computer readable medium of example 8, wherein the instructions cause the one or more processors to map household panelists to devices based on household metering data and the impression data by utilizing a probability distribution model.

Example 14 includes the non-transitory computer readable medium of example 8, wherein the media impression data includes census data, the instructions to cause the one or more processors to generate census audience deduplication counts based on the census data, the unique audience sizes based on the census audience deduplication counts.

Example 15 includes a method comprising accessing media impression data via one or more wireless communications, the media impression data including panel data obtained from a meter and impression information obtained after an access of media at a computing device, determining, by executing an instruction with one or more processors, an audience deduplication based on the panel data, determining, by executing an instruction with the one or more processors, odds ratios for platform combinations based on the audience deduplication, determining, by executing an instruction with the one or more processors, posterior distributions for the media based on the odds ratios, performing, by executing an instruction with the one or more processors, a sequential odds ratio insertion technique based on the posterior distributions to determine unique audience sizes, aligning, by executing an instruction with the one or more processors, the unique audience sizes based on a constraint, and generating, by executing an instruction with the one or more processors, a report including the aligned unique audience sizes.

Example 16 includes the method of example 15, wherein the observed deduplication is across platforms.

Example 17 includes the method of example 16, wherein the platforms include at least one of television, connected television, addressable television, desktop, or mobile.

Example 18 includes the method of example 15, further including determining a prior distribution based on historical information, determining a likelihood distribution based on the odds ratios, and combining the prior distribution and the likelihood distribution to determine the posterior distributions.

Example 19 includes the method of example 15, wherein the unique audience sizes are first unique audience sizes, wherein the aligning of the first unique audience sizes includes estimating second unique audience sizes using (a) marginals as constraints and (b) the first unique audience sizes as a prior, and performing a linear optimization to ensure logical consistency across levels of aggregation.

Example 20 includes the method of example 15, further including mapping household panelists to devices based on household metering data and the impression data by utilizing a probability distribution model.

Example 21 includes the method of example 15, wherein the media impression data includes census data, further including generating census audience deduplication counts based on the census data, the unique audience sizes based on the census audience deduplication counts.

Example 22 includes an apparatus comprising interface circuitry to access media impression data via one or more wireless communications, the media impression data including panel data obtained from a meter and impression information obtained after an access of media at a computing device, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate panel processing circuitry to determine an audience deduplication based on the panel data, priors processing circuitry to determine odds ratios for platform combinations based on the audience deduplication, integration circuitry to determine posterior distributions for the media based on the odds ratios, perform a sequential odds ratio insertion technique based on the posterior distributions to determine unique audience sizes, alignment circuitry to align the unique audience sizes based on a constraint, and reporting circuitry to generate a report including the aligned unique audience sizes.

From the foregoing, it will be appreciated that example methods, apparatus and articles of manufacture have been disclosed that deduplicate audience estimates from multiple computer sources. Examples disclosed herein measure advertisements and media across a changing ecosystem of media-delivery mechanisms to enable discovery of an audience incrementally. Examples disclosed herein create granular audience estimates that maximize the quality and confidence in the measurement across the ever fragmenting hierarchy. The disclosed methods, apparatus and articles of manufacture improve the efficiency of using a computing device by reducing the amount of processing and memory required to determine the unique audience based on detected impressions using models disclosed herein. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
a memory; and
one or more processors coupled to the memory and configured to:
access panel data related to panelist exposure to media using different platforms;
determine an audience deduplication across multiple different platform combinations of the different platforms using the panel data;
determine odds ratios for the multiple different platform combinations based on the audience deduplication;
determine posterior distributions for the media based on the odds ratios;
determine unique audience sizes using a sequential odds ratio insertion technique, wherein the sequential odds ratio insertion technique is based on the posterior distributions; and
generate a report indicative of the unique audience sizes.

2. The system of claim 1, wherein the platforms include at least one of television, connected television, addressable television, desktop, or mobile.

3. The system of claim 1, wherein the one or more processors are configured to:
determine a prior distribution based on historical information;
determine a likelihood distribution based on the odds ratios; and
combine the prior distribution and the likelihood distribution to determine one of the posterior distributions.

4. The system of claim 1, wherein the unique audience sizes are first unique audience sizes, and wherein the one or more processors are configured to align the first unique audience sizes by:
estimating second unique audience sizes using (a) marginals as constraints and (b) the first unique audience sizes as a prior; and
performing a linear optimization to ensure logical consistency across levels of aggregation.

5. The system of claim 1, wherein the one or more processors are configured to link Internet media monitoring tags to a household via a mapping protocol.

6. The system of claim 1, wherein the unique audience sizes are determined using census data.

7. A non-transitory computer readable medium comprising instructions which, when executed, cause one or more processors to at least:
access panel data related to panelist exposure to media using different platforms;
determine an audience deduplication across multiple different platform combinations of the different platforms using the panel data;
determine odds ratios for the multiple different platform combinations based on the audience deduplication;
determine posterior distributions for the media based on the odds ratios;
determine unique audience sizes using a sequential odds ratio insertion technique, wherein the sequential odds ratio insertion technique is based on the posterior distributions; and
generate a report indicative of the unique audience sizes.

8. The non-transitory computer readable medium of claim 7, wherein the platforms include at least one of television, connected television, addressable television, desktop, or mobile.

9. The non-transitory computer readable medium of claim 7, wherein the instructions cause the one or more processors to:
determine a prior distribution based on historical information;
determine a likelihood distribution based on the odds ratios; and
combine the prior distribution and the likelihood distribution to determine one of the posterior distributions.

10. The non-transitory computer readable medium of claim 7, wherein the unique audience sizes are first unique audience sizes, the instruction to cause the one or more processors to align the first unique audience sizes by:
estimating second unique audience sizes using (a) marginals as constraints and (b) the first unique audience sizes as a prior; and
performing a linear optimization to ensure logical consistency across levels of aggregation.

11. The non-transitory computer readable medium of claim 7, wherein the instructions cause the one or more processors to link Internet media monitoring tags to a household via a mapping protocol.

12. The non-transitory computer readable medium of claim 7, wherein the unique audience sizes are determined using census data.

13. A method comprising:
accessing panel data related to panelist exposure to media using different platforms;
determining, by one or more processors, an audience deduplication across multiple different platform combinations of the different platforms using the panel data;
determining, by the one or more processors, odds ratios for the multiple different platform combinations based on the audience deduplication;
determining, by the one or more processors, posterior distributions for the media based on the odds ratios;
determining, by the one or more processors, unique audience sizes using a sequential odds ratio insertion technique, wherein the sequential odds ratio insertion technique is based on the posterior distributions; and
generating, by the one or more processors, a report indicative of the unique audience sizes.

14. The method of claim 13, wherein the platforms include at least one of television, connected television, addressable television, desktop, or mobile.

15. The method of claim 13, further including:
determining a prior distribution based on historical information;
determining a likelihood distribution based on the odds ratios; and
combining the prior distribution and the likelihood distribution to determine one of the posterior distributions.

16. The method of claim 13, wherein the unique audience sizes are first unique audience sizes, and wherein the method further comprises aligning the first unique audience sizes by:

estimating second unique audience sizes using (a) marginals as constraints and (b) the first unique audience sizes as a prior; and performing a linear optimization to ensure logical consistency across levels of aggregation.

\* \* \* \* \*